US008589851B2

(12) United States Patent
Iyer et al.

(10) Patent No.: US 8,589,851 B2
(45) Date of Patent: Nov. 19, 2013

(54) INTELLIGENT MEMORY SYSTEM COMPILER

(75) Inventors: Sundar Iyer, Palo Alto, CA (US);
Sanjeev Joshi, San Jose, CA (US);
Shang-Tse Chuang, Los Altos, CA (US)

(73) Assignee: Memoir Systems, Inc., Santa Clara, CA (US)

( * ) Notice: Subject to any disclaimer, the term of this patent is extended or adjusted under 35 U.S.C. 154(b) by 106 days.

(21) Appl. No.: 12/806,946

(22) Filed: Aug. 23, 2010

(65) Prior Publication Data

US 2011/0145777 A1    Jun. 16, 2011

Related U.S. Application Data

(60) Provisional application No. 61/284,260, filed on Dec. 15, 2009.

(51) Int. Cl.
*G06F 17/50* (2006.01)
*G06F 9/455* (2006.01)

(52) U.S. Cl.
USPC ........................................................ 716/132

(58) Field of Classification Search
USPC ........................................................ 716/132
See application file for complete search history.

(56) References Cited

U.S. PATENT DOCUMENTS

2009/0144045 A1*   6/2009   Kanade .......................... 703/21

* cited by examiner

*Primary Examiner* — Suresh Memula
(74) *Attorney, Agent, or Firm* — Dag Johansen, Esq.

(57) ABSTRACT

Designing memory subsystems for integrated circuits can be time-consuming and costly task. To reduce development time and costs, an automated system and method for designing and constructing high-speed memory operations is disclosed. The automated system accepts a set of desired memory characteristics and then methodically selects different potential memory system design types and different implementations of each memory system design type. The potential memory system design types may include traditional memory systems, optimized traditional memory systems, intelligent memory systems, and hierarchical memory systems. A selected set of proposed memory systems that meet the specified set of desired memory characteristics is output to a circuit designer. When a circuit designer selects a proposed memory system, the automated system generates a complete memory system design, a model for the memory system, and a test suite for the memory system.

10 Claims, 15 Drawing Sheets

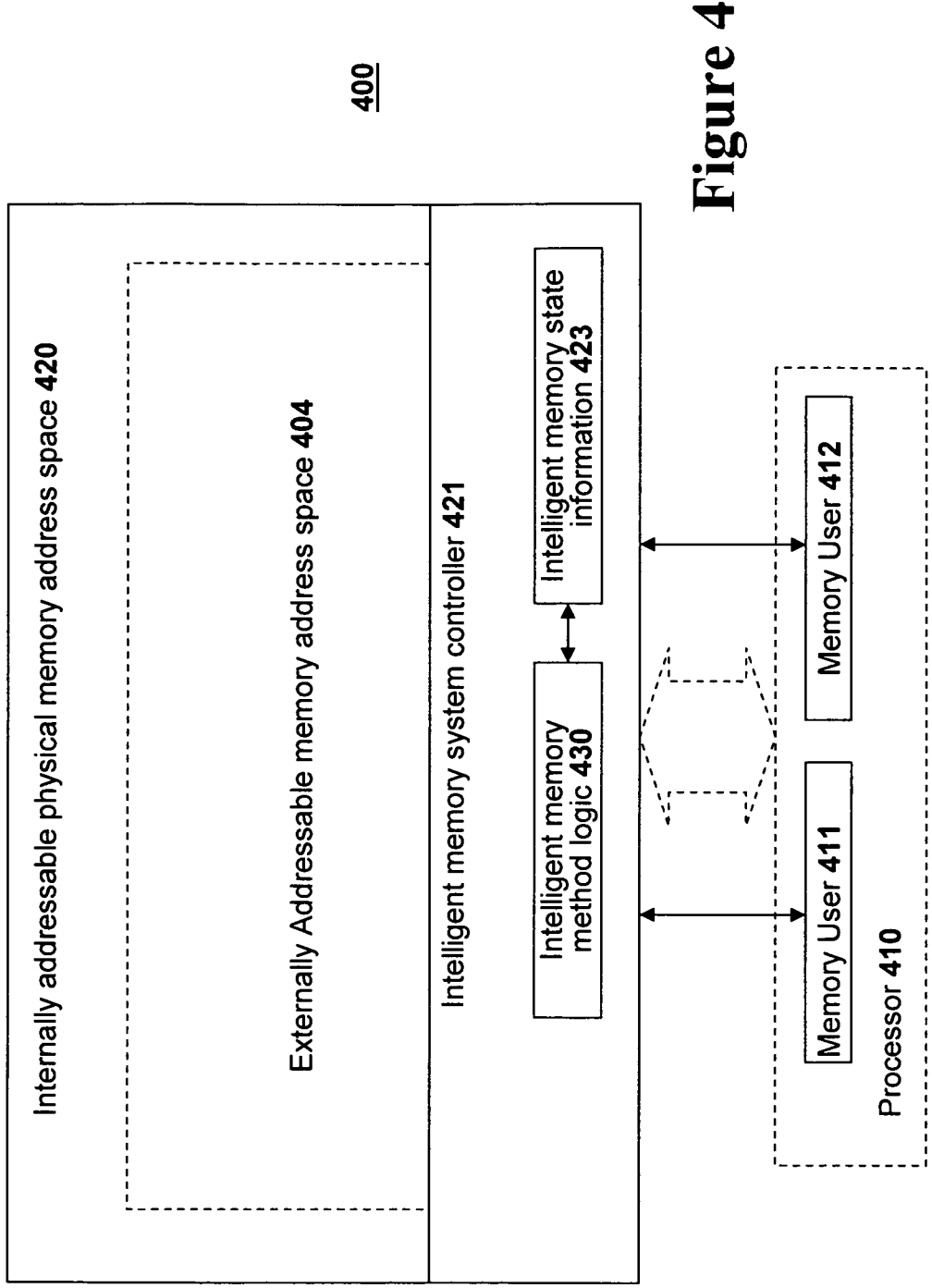

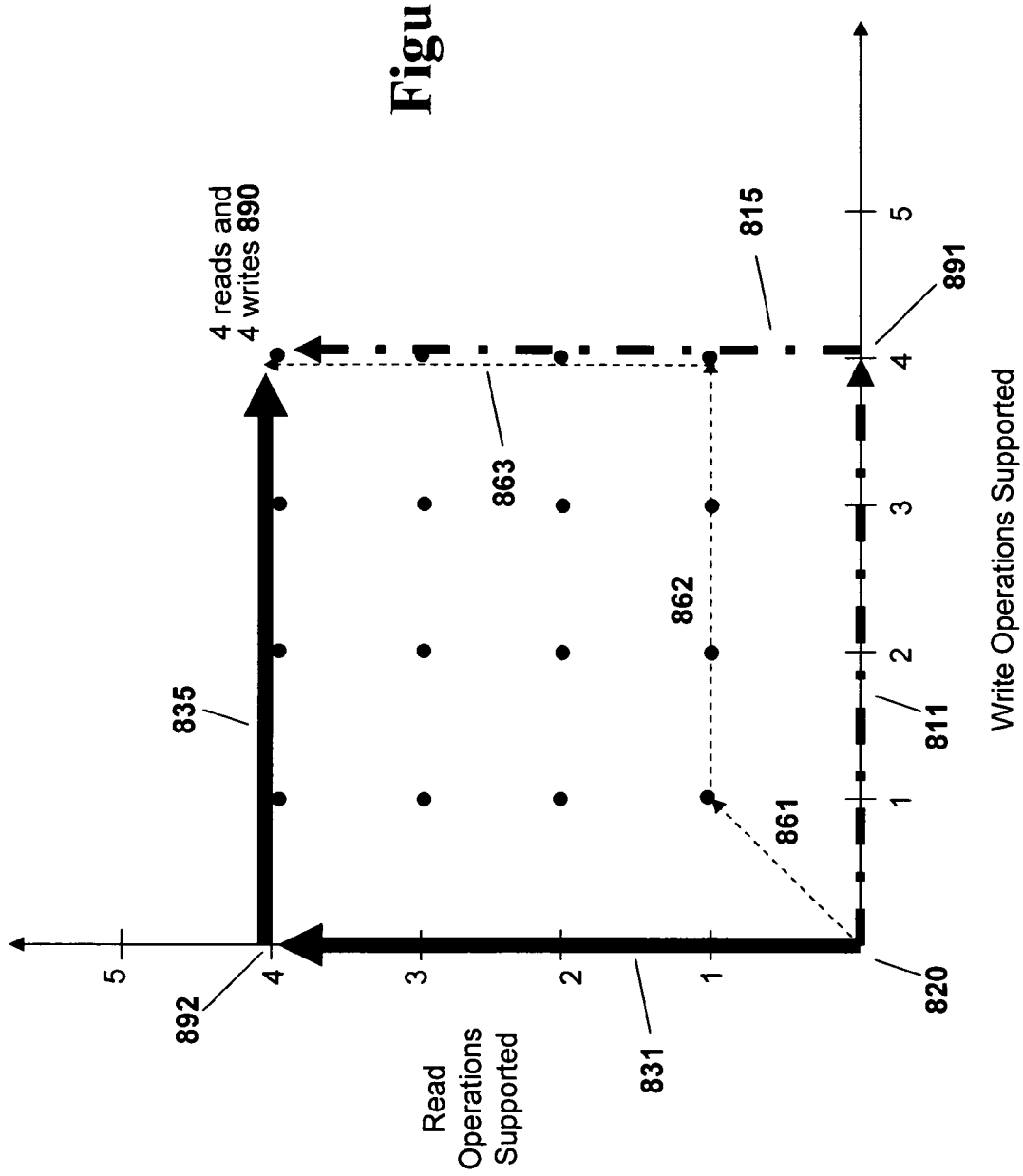

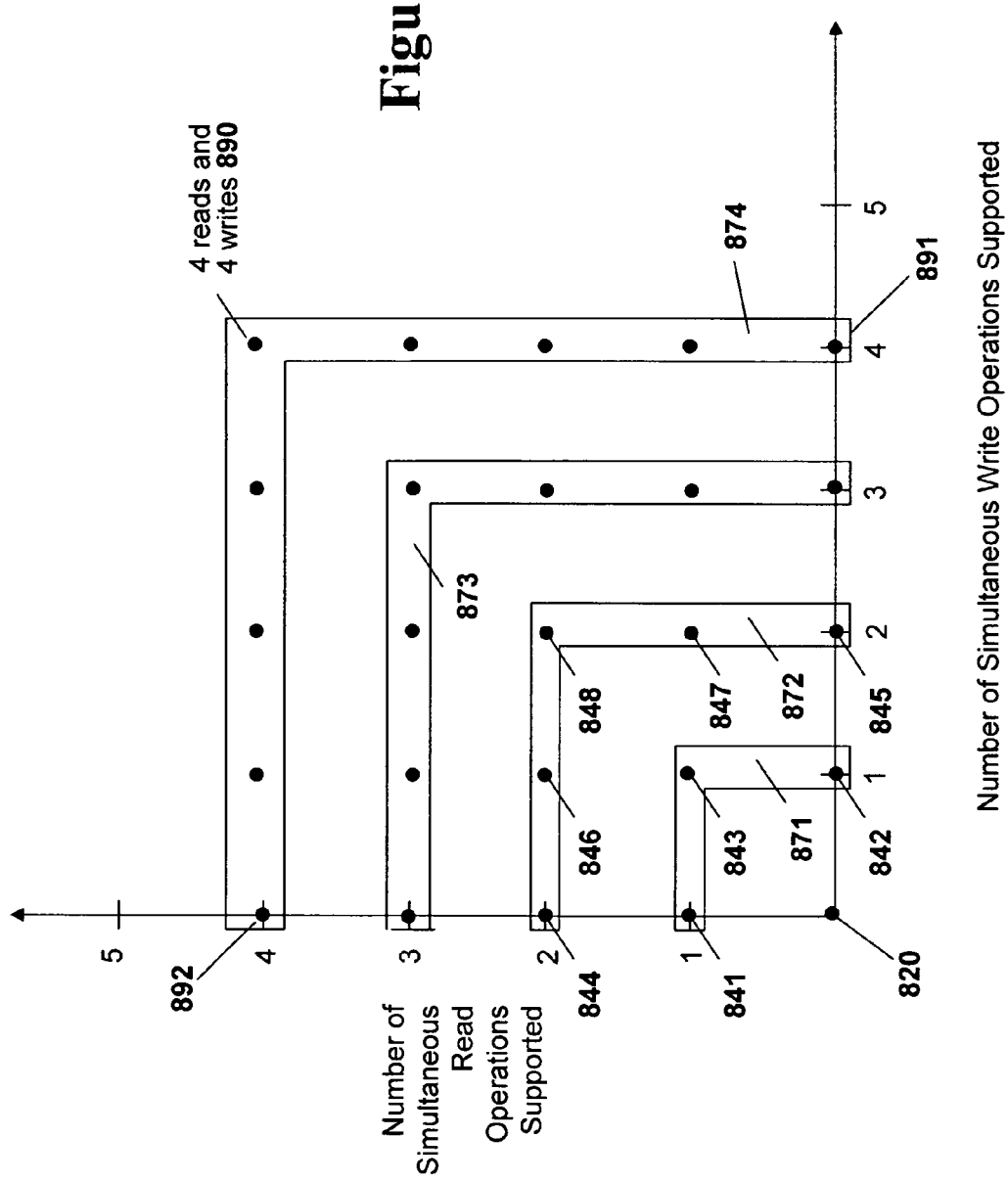

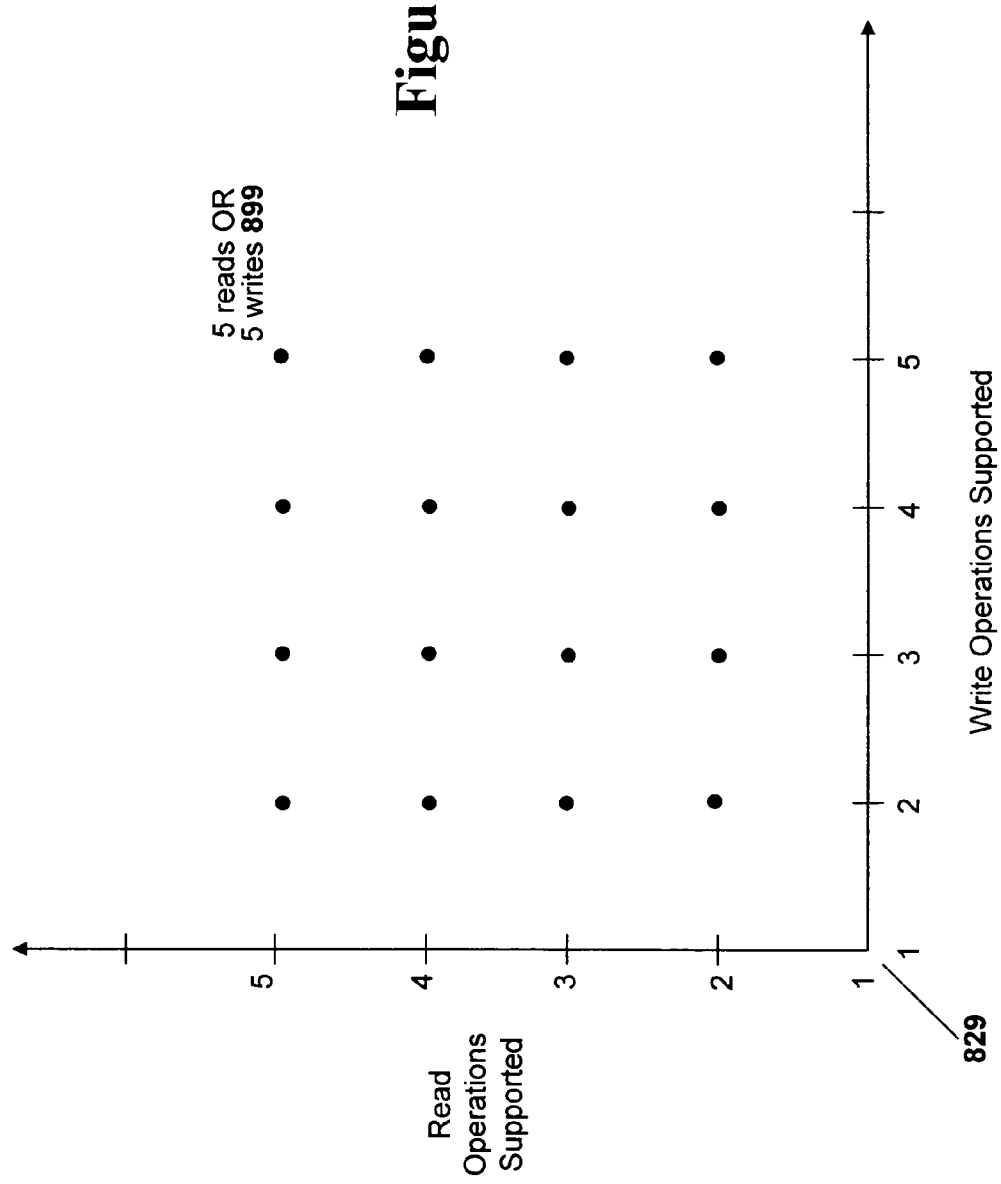

INTELLIGENT MEMORY SYSTEM COMPILER

RELATED APPLICATIONS

The present patent application is related to and hereby incorporates by reference the following U.S. patent applications: "SYSTEM AND METHOD FOR STORING DATA IN A VIRTUALIZED HIGH SPEED MEMORY SYSTEM" filed on Sep. 8, 2009 having Ser. No. 12/584,645; "SYSTEM AND METHOD FOR STORING DATA IN A VIRTUALIZED HIGH SPEED MEMORY SYSTEM" filed on Dec. 15, 2009 having Ser. No. 12/653,660; "SYSTEM AND METHOD FOR REDUCED LATENCY CACHING" filed on Dec. 15, 2009 having Ser. No. 61/284,260; and "HIGH SPEED MEMORY SYSTEMS AND METHODS FOR DESIGNING HIERARCHICAL MEMORY SYSTEMS" filed on Aug. 17, 2010 and having Ser. No. 12/806,631.

TECHNICAL FIELD

The present invention relates to the field of memory systems for of digital computer systems. In particular, but not by way of limitation, the present invention discloses techniques for designing and constructing digital memory systems optimized for a specified set of desired characteristics.

BACKGROUND

Modern computer systems generally include at least one processor for processing computer instructions and a memory system that stores the instructions and data processed by the processor. (Note that 'computer system' is a broad class of devices that includes any device with a process and memory such as personal computer systems, cellular telephones, embedded control systems within personal electronics, servers, etc.) The memory system of a computer system may be implemented with discrete memory chips or as memory cells fabricated on the same integrated circuit as the processor. Most personal computer systems use a combination of both memory cells fabricated on the same die as the integrated circuit as the processor and external off-chip memory.

When designing a computer system, the computer system designer will specify a memory system with a defined set of memory system characteristics. These memory system characteristics may include metrics such as total memory capacity, memory bus width, and memory speed. Once the requirements for a memory system are defined, the computer system designer then designs a memory system that fulfills the requirements.

To construct an on-chip memory system, an integrated circuit designer couples many individual memory cell circuits together to form a memory array. Then, the integrated circuit designer provides support circuitry that address memory cells within the array and read or write data bits into those memory cells.

Creating an efficient high-performance on-chip memory system is a difficult task that generally requires a team of engineers. However, many integrated circuits do not require the optimal performance from on-chip memory systems. For such integrated circuits, an integrated circuit designer may use a physical memory compiler tool that can provide an "off-the-shelf" memory module. Specifically, the integrated circuit designer provides the physical memory compiler tool with a set of desired memory system characteristics and the physical memory compiler tool generates a memory design that can be used within the integrated circuit. This technique reduces development time and development cost.

However, the performance of memory modules created by physical memory compilers tends to be limited. Furthermore, the memory modules created by physical memory compilers generally do not efficiently use valuable layout area. Thus, it would be desirable to improve the techniques and tools used to design and construct memory systems for integrated circuits.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 4 illustrates a high level conceptual diagram of an intelligent memory system that can handle two memory operations simultaneously.

FIG. 8A illustrates a conceptual chart depicting different methods of creating a complex memory system that can handle several simultaneous write operations and read operations.

FIG. 8B illustrates how an automated memory design system may start by designing relatively simple e intelligent memory systems near the origin and progressively design more complex memory systems until reaching a final desired memory system.

FIG. 8C illustrates a conceptual chart depicting different methods of creating a complex memory system that can handle several simultaneous write operations or read operations.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the example embodiments are disclosed with reference to DRAM and SRAM, the teachings can be used with any type of digital memory circuitry. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
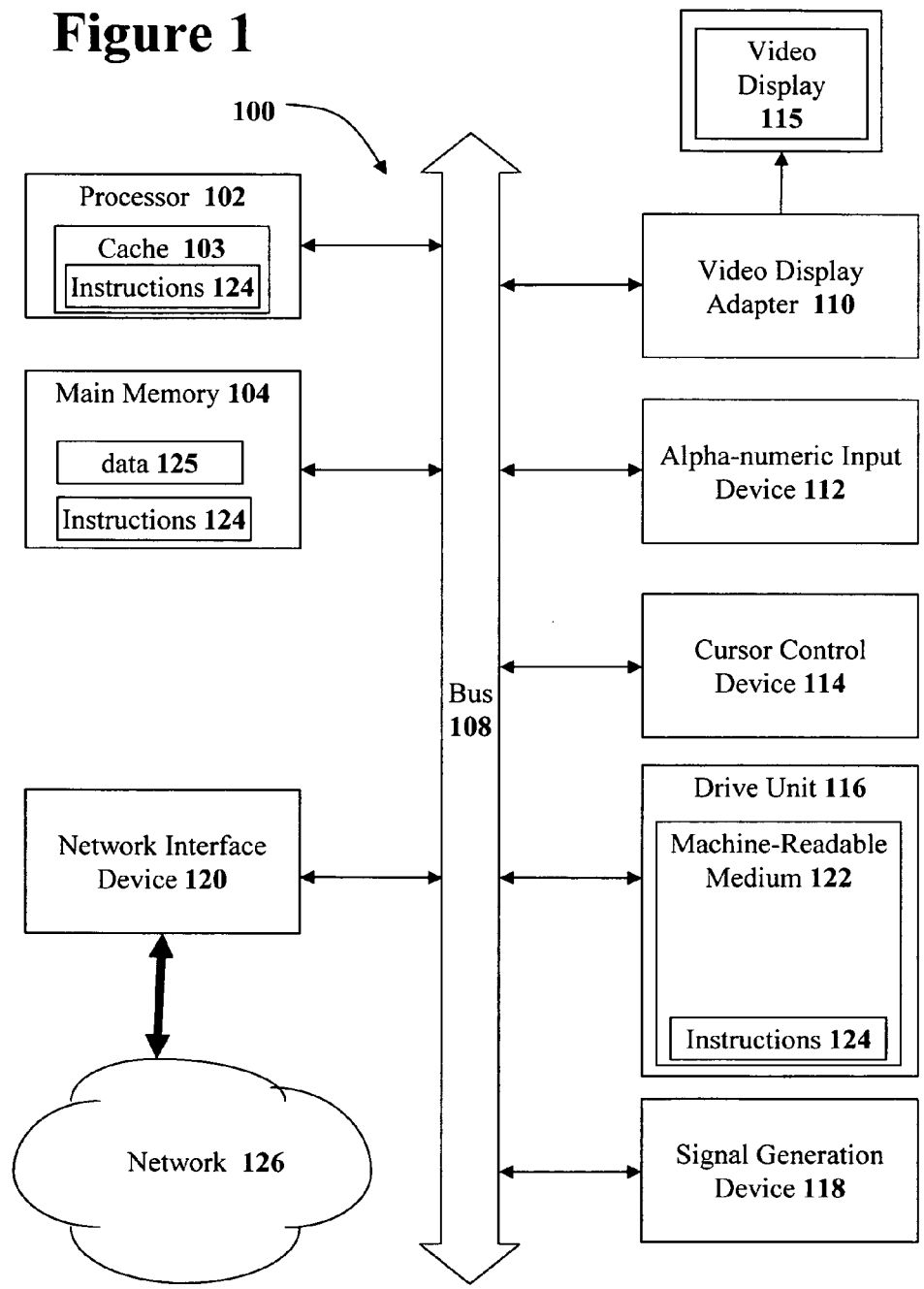
FIG. 1 illustrates a diagrammatic representation of machine in the example form of a computer system within which a set of instructions, for causing the machine to perform any one or more of the methodologies discussed herein, may be executed.

The present disclosure concerns memory systems for digital computer systems and techniques for designing memory systems. FIG. 1 illustrates a diagrammatic representation of a machine in the example form of a digital computer system 100 that may be used to implement portions of the present disclosure. Within digital computer system 100 of FIG. 1, there are a set of instructions 124 that may be executed by processor 102 for causing the machine to perform any one or more of the methodologies discussed within this document.

In a networked deployment, the machine of FIG. 1 may operate in the capacity of a server machine or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 of FIG. 1 includes a processor 102 (e.g., a central processing unit (CPU), a graphics processing unit (GPU) or both) and a main memory 104, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120. Note that not all of the parts illustrated in FIG. 1 will be present in all embodiments of a computer system. For example, a computer server system may not have a video display adapter 110 or video display system 115 if that server is controlled through the network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within a cache memory 103 associated with the processor 102. The main memory 104 and the cache memory 103 associated with the processor 102 also constitute machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Memory Cell Types (RAM, SRAM, etc.)

One of the most fundamental circuits in digital electronics is the memory cell circuit. A memory cell circuit is a circuit designed to store a single binary digit, commonly known as a 'bit', that may be in one of two different states ("0" or "1"). A memory cell circuit must be able to handle a write request and a read request. Specifically, the memory cell circuit handles a write request by storing a specified data bit into the memory cell circuit for later retrieval. The memory cell handles a read request by providing the stored data bit value to the requestor.

There are many different types of memory cell circuit designs. Each different type of memory cell circuit design has its own of advantages and disadvantages. Traditional dynamic random access memory (DRAM) cells provide high-density storage but must be continually refreshed and have limited speed performance. Static random access memory (SRAM) cells provide significantly better performance than DRAM cells but have a lower memory density than DRAM and consume more power. Flash memory cell circuits have the ability to store data bits even after operating power has been removed from a system whereas both SRAM and DRAM will lose their stored data bits when external power is removed.

In addition to DRAM, SRAM, and flash memory cells there are many other types of memory cell circuit designs that provide different advantages and disadvantages. The techniques of present disclosure can be used with any different type of memory cell circuit design. Specifically, as long as a memory cell circuit can be fabricated as part of a memory array in an integrated circuit and has a defined set of memory specifications, that memory cell circuit may be used within the systems and methods disclosed in this document.

When a new integrated circuit fabrication process is developed, one of the first tasks is to develop memory cell circuit designs for use with that new integrated circuit fabrication process. Specifically, the geometry of the semiconductor, insulator, and metal materials used to construct a memory cell circuit must be designed, verified, thoroughly tested, and perfected. The task of designing the physical geometry of a reliable memory cell circuit for a new integrated circuit fabrication process is very difficult. However, the end result will be a memory cell circuit design that will be used countless billions of times within various digital different integrated circuits. More than half of a digital integrated circuit may be made up of memory cell arrays such that creating a very reliable, efficient, and easy to manufacture memory cell circuit is very important.

Each different type of memory cell circuit (DRAM, SRAM, flash, etc.) is defined by a set of memory performance characteristics, physical characteristics, and operational requirements. Memory cell performance characteristics, physical characteristics, and operational requirements may include:

Voltage Requirements

Maximum clock speed (The maximum rate at which the cell may operate)

Timing requirements

Layout area (the amount of area required to construct the memory cell)

Process type (the semiconductor manufacturing processes that may be used)

The memory support circuitry that interacts with a memory cell circuit must operate within the defined operational requirements of the memory cell circuit. Note that some of the performance may be dependent on each other. For example, depending on the clock speed chosen, the voltage requirements for the memory cell circuit may vary.

The memory requirements of different integrated circuits will vary depending upon the application of the integrated circuit. For example, a high-speed communications chip may require very high-performance memory cells to quickly store and retrieve data packets. Conversely, an integrated circuit for a low-cost consumer electronics device may need a high bit-density (bits per layout area) in order to minimize the size (and thus cost) of the integrated circuit. To handle these different memory system needs, more than one memory cell circuit may be designed wherein each different memory cell circuit design is optimized for a different set of characteristics. Thus, one memory cell circuit may be optimized for high-speed performance (can operate at higher clock frequencies) such that it can be used in the above communication chip example. Similarly, another memory cell circuit may be optimized for achieving a high bit density but will not be able to operate at high clock speeds.

Memory Cell Port Features

A basic memory cell circuit has a single port that can handle either a single write operation or a single read operation but not both a write operation and a single read operation simultaneously. However, the circuitry of a memory cell may be modified to split the write and read functions such that a memory cell circuit may have two ports for accessing the memory cell: a first port for handling write requests and a second port for handling read requests. Such a "two-port" memory cell can handle a single read operation and a single write operation simultaneously. Certain applications that continually read source information and write back processed information can greatly benefit by using two ported memory cells since new source information can be read while simultaneously writing back processed information.

Additional circuitry may be added to create a "dual-port" memory cell wherein the memory cell circuit has two fully independent ports for accessing the data bit stored in the memory cell. Specifically, both memory ports can handle a read operation or a write operation. Thus, a dual-port memory cell can handle two read operations simultaneously, two write operations simultaneously, or a single read operation and a single write operation simultaneously. The order in which two simultaneously received memory transactions addressing the same memory cell are handled will vary depending on the particular implementation. With a dual-port memory system, two processors can independently access a single shared memory system without conflicting with each other.

There are several even more complex variations of memory cell circuits. A four-port memory cell circuit may have two read ports and two write ports. All four ports are completely independent, and can access any location simultaneously (except the two write ports cannot access the same location simultaneously). A five-port memory cell may have four read ports and one write port. Many additional memory cell circuit variations exist.

Memory Modules

Individual memory cell circuits are generally not used alone. Instead, many memory cell circuits are combined together into a memory array. To use a memory array, additional support circuitry is required. For example, addressing circuitry is required to address a specific desired memory cell or, more often, a set of memory cells generally referred to as a "data word" within a memory cell array. After a particular data word in the memory array has been addressed, support circuitry is required to write to the memory cells or read from the memory cells of the addressed data word. After performing a read operation, an output driver circuit is generally required to respond with the results of the memory read operation.

In a DRAM memory system, a row and column addressing system is used to select specific memory cells in a memory cell array. For a memory write operation, typically a row is read from the array, modified with the write value, and then written back into the array to store the modified value. Read operations are handled in a similar manner. Specifically, a row is read from the array, the requested data is then driven with an output buffer, and then the row of data is written back into the array. DRAM memory systems may also include refresh circuitry to keep data bit values valid. Other types of memory cell circuit designs will use other support circuits to provide the same basic features. The specific support circuitry required for a particular memory cell circuit will vary depending upon the type of memory cell circuit (DRAM, SRAM, or other). The design of memory cells and memory cell support circuitry is very well known in the art of computer engineering.

Since memory cell circuits and the associated support circuitry are well known in the field and will vary depending upon the specific type of memory cell circuit being used, this document will treat memory cell arrays and their support circuitry as abstractions. Thus, although some embodiments may be disclosed with reference to a specific memory cell circuit type, the teachings of the present invention may be applied to many different types of digital memory cell circuits.

A single instance of memory support circuit (such as an output driver) may support many memory cell circuits. However, due to timing requirements and voltage requirements, there is typically an upper limit to the number of memory cell circuits that a single instance of support circuit can support. The number of memory cell circuits that may be supported is also affected by the specific memory array layout geometry since long conductor lines will increase parasitic capacitance and thus affect the performance of the memory system. As more memory cell circuits are supported by a single instance of support circuitry, the performance of the memory system may decrease such that reduced clock speeds may be needed to support the greater number of memory cell circuits. Thus, the allocation of instances of support circuitry and the physical geometry of a memory module will affect the performance characteristics and requirements of a memory module. Depending on the memory circuit type, the support circuitry allocation may be altered by creating physically larger instances of the support circuitry or adding additional instances of support circuitry.

Figure 2C:
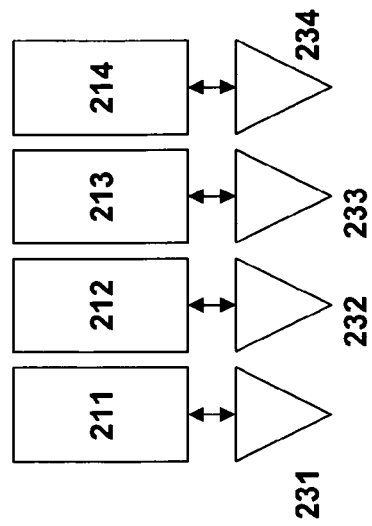
FIG. 2C conceptually illustrates the layout of a memory module comprising of four memory cell arrays in a parallel arrangement supported by four instances of support circuitry.
Figure 2B:
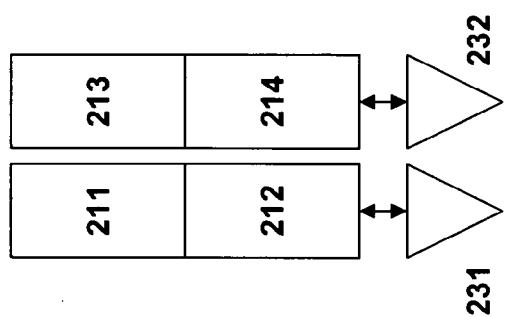
FIG. 2B conceptually illustrates the layout of a memory module comprising of four memory cell arrays in a rectangular arrangement supported by two instances of support circuitry.
Figure 2A:
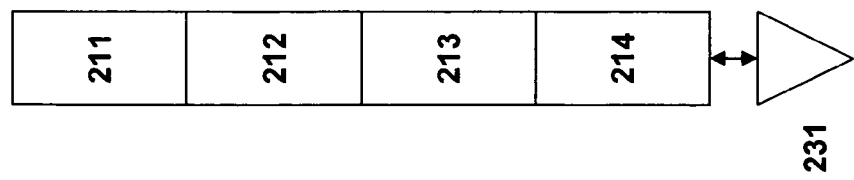
FIG. 2A conceptually illustrates the layout of a memory module comprising of four memory cell arrays in a linear arrangement supported by a single instance of support circuitry.

FIG. 2A conceptually illustrates the layout of a memory module comprising of four memory cell arrays 211, 212, 213, and 214 supported by a single instance of support circuitry 231. In the arrangement of FIG. 2A, the four memory cell arrays 211, 212, 213, and 214 are arranged in a thin linear arrangement. In the linear arrangement of FIG. 2A, memory array 211 is located relatively far away from the support circuitry 231 such that propagation delay may limit the speed at which the memory module of FIG. 2A may operate.

FIG. 2B illustrates another layout of a memory module with the same four memory cell arrays 211, 212, 213, and 214. In the embodiment of FIG. 2B, the four memory cell arrays 211, 212, 213, and 214 are arranged in a shorter but wider rectangular arrangement and are supported by two instances of support circuitry (231 and 232). The two instances of support circuitry (231 and 232) are being used as an abstraction which may represent two different instances of the same circuit, a larger version of the same circuit that can handle more power, or any other change to the support circuitry provides more capability in exchange for more layout area used.

Referring again to FIG. 2B, since the furthest distance between a memory cell and the support circuitry has been reduced, the propagation delay will also be reduced such that the memory module of FIG. 2B may operate at higher clock frequencies than the memory module of FIG. 2A. Furthermore, the layout of FIG. 2B uses two instances of support circuitry such that each instance of support circuitry (231 and 232) only needs to support half as many memory arrays. Thus, the memory system of FIG. 2B will operate better than the memory system of FIG. 2A but it consumes more layout area.

FIG. 2C illustrates a third layout of a memory module with the same four memory cell arrays 211, 212, 213, and 214. In the embodiment of FIG. 2C, the four memory cell arrays 211, 212, 213, and 214 are arranged in parallel and are each supported by their own instances of support circuitry (231, 232, 233, and 234). Again, the reduced signal travel distances and additional support circuitry instances will allow the embodiment illustrated in FIG. 2C to operate at faster clock speeds than the embodiment of FIG. 2B. However, the bit density of the memory module illustrated in FIG. 2C will be lower than the bit density of the memory modules illustrated in FIGS. 2A and 2B due to the larger amount of layout area used to implement the four instances of support circuitry (231, 232, 233, and 234).

As illustrated by FIGS. 2A, 2B, and 2C, the same sized memory module may be constructed in many different ways and each different layout will have different performance characteristics. Furthermore, the different layouts will use different amounts of layout area thus providing different bit density values. The different layouts also have different shapes. All three memory module layouts are useful and each memory module design will have advantages over the other designs for a particular application.

In order to create the best memory module for a specific application, a team of engineers can be assigned the task of designing a memory module. The engineering team can investigate the different memory cell circuits that are available for use and then select the best memory cell circuit for the specific application. The memory design team may consider different layout patterns and determine a layout of the memory cells and support circuitry that is optimized for the needs of the specific application. The memory module may be optimized for various different metrics such as operating speed, bit density, power consumption, manufacturing reliability, etc. The end result of the memory engineering team's work will be a memory module that is highly optimized for the specific integrated circuit application.

Although custom designing a memory module for an integrated circuit in this manner will likely produce an excellent memory module for the specific application, this method of designing an integrated circuit memory module will take time and cost a large amount of money. Such a thorough memory module design procedure can be justified for a high-priced high-performance integrated circuit or an integrated circuit that will be reproduced millions of times. But for many integrated circuits with typical memory requirements, assigning a dedicated engineering team to design a custom memory is far too costly.

Physical Memory Compilers (Automatically Generated Geometries

To create a digital integrated circuit, a complex pattern of geometric of semiconductor materials, insulators, and conductors is created. The geometric pattern must abide by a set of design rules for the integrated circuit process in order to be reliably manufactured. However, creating integrated circuits with raw geometric shapes is not an efficient method of designing integrated circuits.

To simplify the design of digital integrated circuits, integrated circuit manufacturers created a set of standard cells that provide basic Boolean logic functions such (AND, OR, XOR, 11OR, inverters). With a set of standard library of cells, a digital integrated circuit designer may design circuits by creating formal digital logic to achieve a desired goal. The standard cells are then used to implement the formal digital logic.

To further simplify the design of digital integrated circuits, logic synthesis tools were created. Logic synthesis tools allow a digital circuit designer to design a digital integrated circuit using a Hardware Design Language (HDL) that is similar to software source code. An integrated circuit designed with a Hardware Design Language (HDL) is processed by a logic synthesis tool to generate a gate-level netlist.

These advances in digital circuit design tools have greatly reduced the cost and complexity of designing digital integrated circuits and thus allowed for the creation of Application Specific Integrated Circuits (ASICs). An application specific circuit is an integrated circuit that is designed for a specific application in a specific electronic product instead of a generic integrated circuit that may be used in a wide variety of different electronic devices. Thus, a set of efficient design tools allowed custom integrated circuits to be designed for specific applications even though the number of integrated circuits needed may not be extremely large.

Integrated circuit manufacturers that made their standard cell libraries available to outside companies and offered to manufacture integrated circuits designed using those standard cell libraries are referred to as ASIC vendors. In addition to the relatively limited tools provided by integrated circuit manufacturers, third party ASIC vendor companies created even more sophisticated integrated circuit design tools that could be used to design integrated circuits which could be manufactured by an integrated circuit manufacturer (provided that the design tool followed the design rules of the integrated circuit manufacturing process). Over the years, the standard cell libraries were supplemented with large libraries of more complex circuits that provide many commonly needed circuits such as processor cores, Input/Output circuits, memory management circuits, bus control circuits, communication protocol circuits, SRAM, embedded DRAM (eDRAM), etc.

To aid in the design of memory modules for use within an ASIC, each ASIC vendor generally provides a 'physical memory compiler' (or 'memory generator') design tool. A physical memory compiler is a digital integrated circuit design tool that allows a digital integrated circuit designer to specify a set of operational characteristics for a memory module needed for an integrated circuit. The physical memory compiler then uses the specified operational characteristics to generate one or more designs for physical memory modules that meet the specified memory system requirements. Thus, using a physical memory compiler, an integrated circuit designer can quickly create "off-the-shelf" memory modules for use within a custom integrated circuit.

Figure 3:
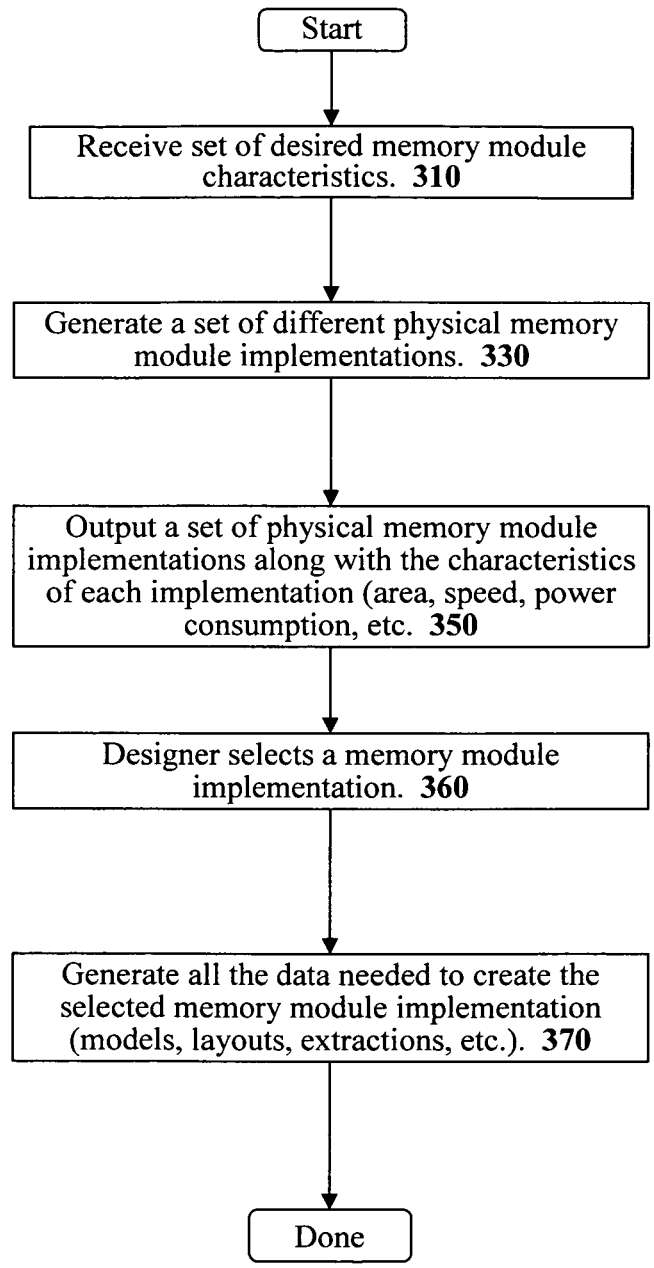
FIG. 3 illustrates a flow diagram describing how a physical memory compiler is typically used to create a traditional memory module.

FIG. 3 illustrates a flow diagram generally describing how a physical memory compiler is typically used to create a memory module for use in an integrated circuit. Initially, at stage 310, the integrated circuit designer begins the process by entering the specification for the memory module that is needed for an application specific integrated circuit. The specific memory specifications entered will vary depending on the implementation of the physical memory compiler. Examples of memory specifications that may be entered include:

(1) Memory cell type (1-port SRAM, 2-port SRAM, DRAM, etc.)

(2) Selection of memory cell optimized for bit density or performance (3) Memory capacity (total number of addressable memory locations)

(4) Word size (width of the data unit at each addressable memory location)

(5) Required clock speed (6) Features (subword ability, sleep mode, redundancy, leakage control, etc.)

Referring back to FIG. 3, the physical memory compiler then generates memory module designs for memory modules that fulfill the specified memory system requirements at stage 330. Various different techniques may be used to create different memory module designs.

In one embodiment, the memory compiler has a set of pre-defined memory blocks of various types, shapes, and sizes that the memory compiler selects from and combines to create the requested memory block. For example, the memory compiler may have pre-designed memory blocks that are 8K, 16K, 32K, and 64K in size. For each memory block size there may be multiple layout shapes. To create a 128K memory module, the system may create a set memory block permutations that add up to 128K (two square 64K blocks, two rectangular 64K blocks, two square 32K blocks and one square 64K block, etc.).

In another embodiment, the physical memory compiler actually designs physical memory layouts on the fly using various memory sub-component templates. For example, the word-line drivers, decoders, sense amps, and other memory system sub-components may be available in various template forms. For a given bit capacity range, a suitable template for each of these sub components is selected. The templates are combined using an overall memory system design template that specifies how the sub-components are interconnected. The overall shape of the memory system is often controlled by these sub-component selections. However, these memory sub-components can be created in different shapes and different aspect ratios to allow the final memory system to be generated in different shapes and aspect ratios.

These two different methods may be combined. For example, a first set of templates may be used for creating memory blocks from 0K to 8K, another set of templates may be used for making memory blocks from 8K to 16K, and so on.

After generating various permutations of physical memory layouts that satisfy the specified memory system requirements, the memory compiler presents the memory modules to the designer at stage 350. Each memory module may be presented along with various specifications for the memory modules such as maximum operating clock rate, physical dimensions, access rate, power requirements, leakage rates, etc. The results may be presented in spreadsheet form to allow the integrated circuit designer to sort the proposed designs by the various different characteristics of the memory modules.

The integrated circuit designer may then select one of the proposed memory modules at stage 360. (If the designer is not satisfied with the results, the designer may attempt to re-run the memory compiler with a different set of memory module specifications.) If the designer is satisfied with the selected memory module, the memory compiler will generate the files needed for creating model implementations and physical implementations of the memory module at stage 370. For example, the memory compiler may create files that define a model of the memory module that may be used within simulations of the integrated circuit. If the designer is satisfied with the memory model, the memory compiler will later create the actual geometric layout of the memory module which may be used to create physical integrated circuits.

Physical memory compilers have significantly reduced the work required to create memory modules for use within digital integrated circuits. However, the memory modules created by physical memory compilers are typical designed for general purpose usage. When a memory compiler is developed, the memory compiler is designed to create memory modules that will satisfy the typical needs of many different integrated circuit designers. If an integrated circuit requires a memory module with very high performance, special features, or optimized for a particular parameter then a physical memory compiler cannot be used to create the memory module.

Furthermore, physical memory compilers tend to only handle certain limited memory module size ranges. Thus, if a desired memory module size (or any other specification) is not within the limited range that can be handled by the physical memory compiler then the physical memory compiler cannot be used. When a physical memory compiler cannot be used, the integrated circuit designer may need to create a custom designed memory system. This will obviously greatly increase the development time and cost of the integrated circuit. However, even when a dedicated team is assigned to develop a custom memory system using traditional memory system techniques that dedicated team may not be able to create a memory system that meets all of the desired performance parameters.

Intelligent Memory Systems

As set forth in earlier, a typical traditional memory system consists of an array memory cells for storing data bits coupled to support circuitry responsible for writing data bits into and reading data bits from the memory cells. The support circuitry performs tasks such as decoding a memory address, buffering data, and writing data bits into memory cells, reading data bits out from memory cells, and driving data lines with output data bits. However, a new type of intelligent memory system has been introduced that provides improved memory system performance by adding sophisticated memory controller logic to the memory system. The sophisticated controller logic implements one or more methods that allows the intelligent memory system to provide better performance than a traditional memory system constructed with the same type of memory cell circuits.

An intelligent memory system obviously cannot make the actual underlying memory cell circuits perform better. However, by using the same memory cells within intelligent memory systems that use the memory cells more efficiently, an intelligent memory system can provide an improved performance of the overall memory system. For example, an intelligent memory system may provide improved overall memory system performance by handling multiple memory operations simultaneously.

For example, a typical intelligent memory system may handle two read operations simultaneously, two write operations simultaneously, or a read and a write operation simultaneously by only adding a small amount of additional memory and memory controller logic that implements a specific intelligent memory control method. More complex intelligent memory systems may handle even more complex situations such as simultaneously handling two read operations and two write operations.

FIG. 4 illustrates a high level conceptual diagram of one type of intelligent memory system 400 that can handle two memory operations simultaneously. In the particular intelligent memory system 400 disclosed in FIG. 4, memory user 411 and memory user 412 access the same intelligent memory system 400. Since the intelligent memory system 400 is providing memory services to both memory user 411 and memory user 412, intelligent memory system 400 is effectively providing twice the memory performance of a traditional memory system that could only provide memory services to one of the two memory users.

The concurrent memory requests submitted to the intelligent memory system 400 may be from a single entity operating at twice the speed of two individual entities. For example, processor 410 operating at twice the clock speed of memory user 411 and memory user 412 could issue two consecutive memory requests that would appear as two memory requests received concurrently by intelligent memory system 400. Thus, an intelligent memory system that operates at a slower clock frequency but handles more memory operations per clock cycle can appear to be a high-speed single memory operation memory system.

All of the memory access requests submitted to the intelligent memory system 400 are handled by an intelligent memory system controller 421. The intelligent memory system controller 421 receives the memory access requests (reads, writes, or other memory commands) and performs the requested memory operations. Each intelligent memory system controller 421 includes a specific instance of intelligent memory logic 430 used to handle the memory requests. The intelligent memory logic 430 implements one or more methods that are able to use some additional memory space to support multiple memory operations per clock cycle.

For example, the intelligent memory system 400 of FIG. 4 provides memory services to external users for an externally addressable memory space 404. Specifically, external memory users such as memory users 411 and 412 can issue read and write requests to an externally addressable memory space 404. However, the intelligent memory system 400 actually has an internally addressable memory space 420 that is larger than the externally addressable memory space 404. The intelligent memory logic 430 uses the larger memory space of the internally addressable memory space 420 to simultaneously handle more than one memory operation directed at the externally addressable memory space 404.

In addition to the larger internally addressable memory space 420, the intelligent memory logic 430 may also use some intelligent memory state information 423 within the intelligent memory controller 421. The intelligent memory state information 423 is a set of state information needed to implement the particular memory performance technique implemented by the intelligent memory logic 430. In some embodiments, the intelligent memory state information 423 may be stored within the larger internally addressable memory space 420 or in a separate memory system.

Many different memory management methods may be implemented by the intelligent memory logic 430 to handle more than one memory operation simultaneously. In one particular intelligent memory system, the implemented method uses an extra memory bank and a set of address space mapping tables to handle simultaneous write operations. An example of such an intelligent memory system 500 is illustrated in FIG. 5A.

Figure 5A:
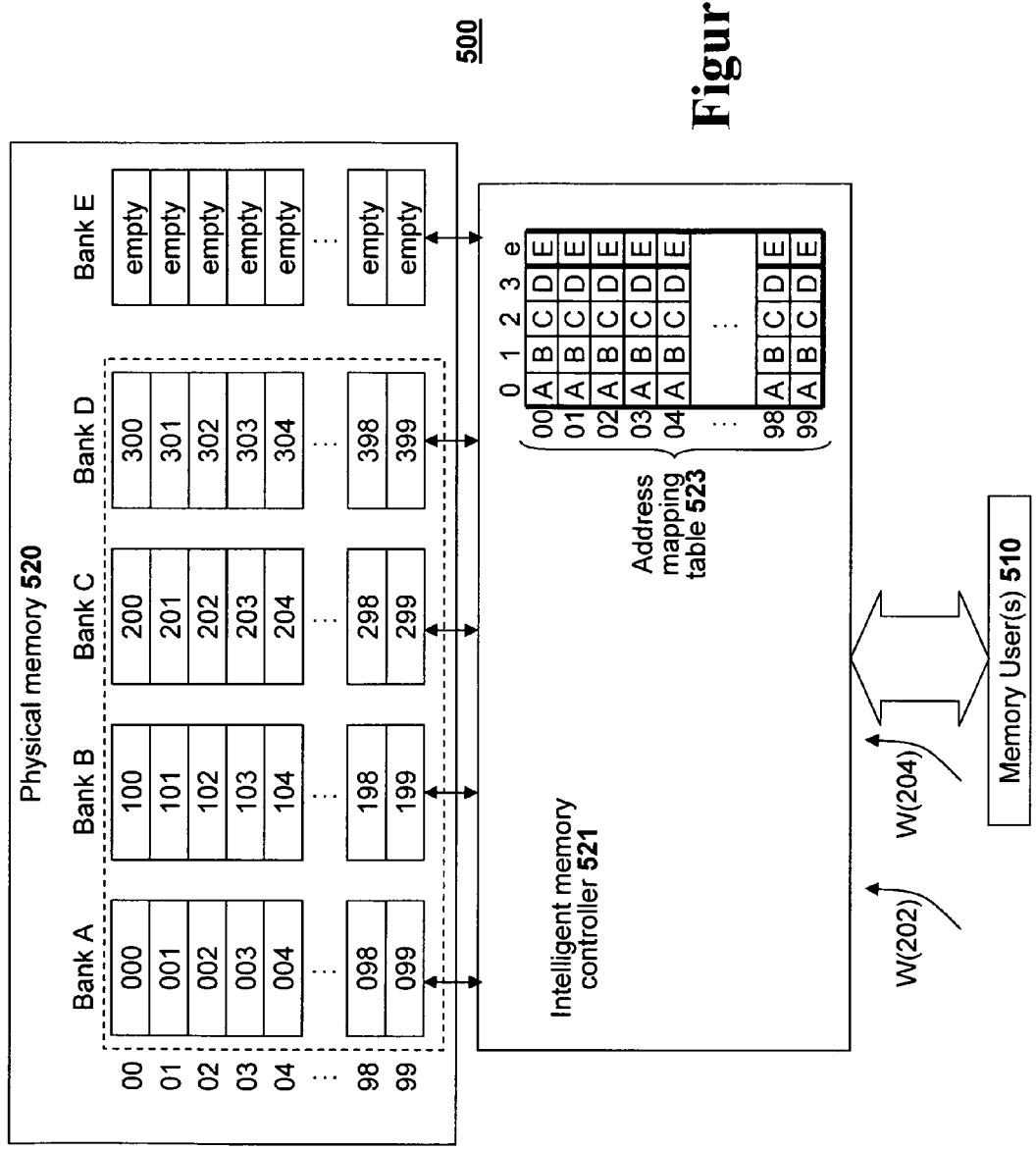
FIG. 5A illustrates a block diagram of an intelligent memory system that can handle two memory operations simultaneously using an extra memory bank.

Referring to FIG. 5A, intelligent memory system 500 is implemented with a physical memory 520 having a set of five independent memory banks (Banks A, B, C, D, and E) that can each simultaneously handle memory operations independent of each other. Thus, when two write operations directed to different memory banks (such as bank A and bank B) are received simultaneously, each memory bank can handle the write operation independently at the same time. However, when two write operations directed to the same memory bank (such as two write operations that are both directed at Bank C) are received simultaneously, that situation must be handled using an intelligent method.

Figure 5B:
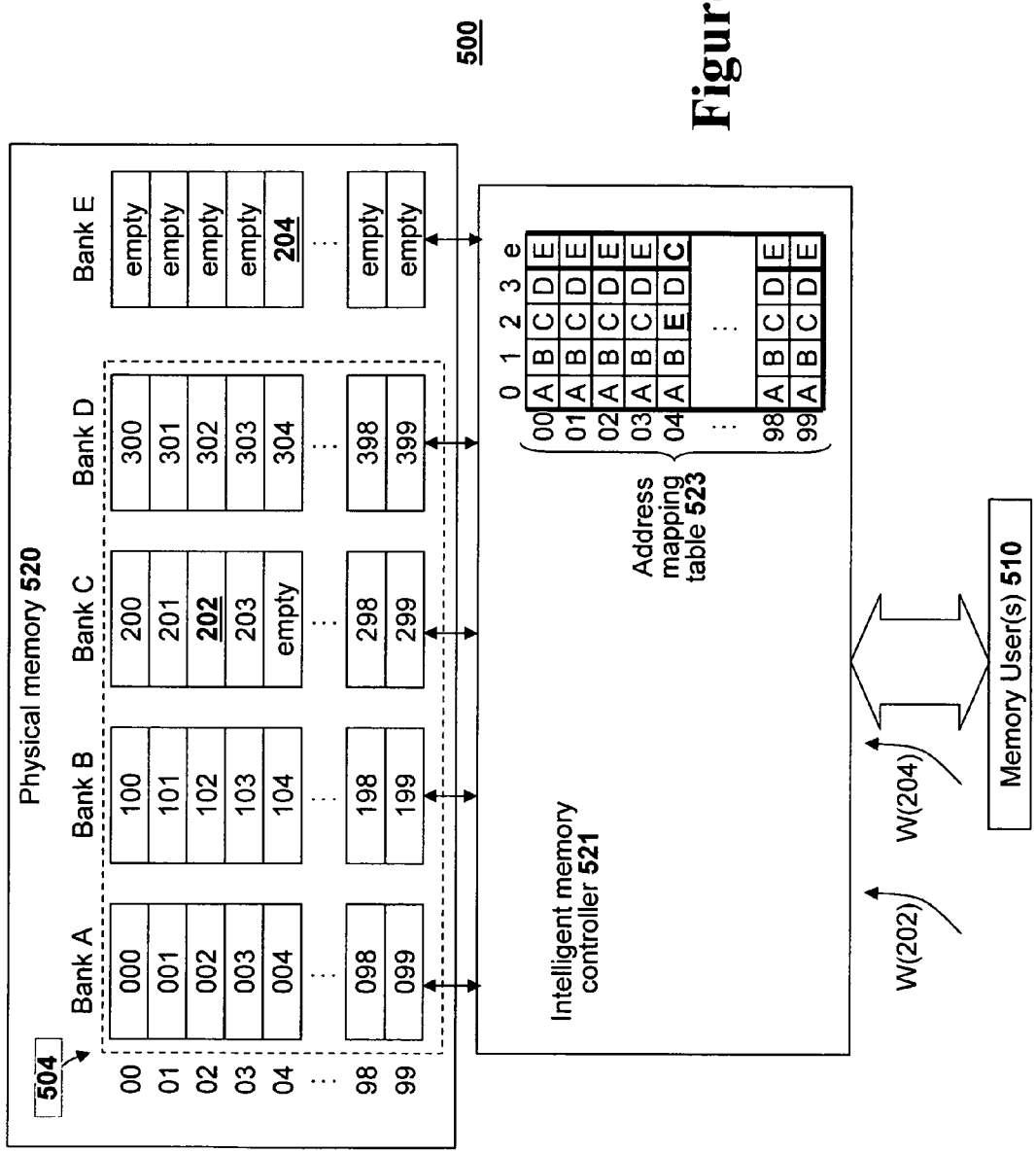
FIG. 5B illustrates a block diagram of the intelligent memory system of FIG. 5A after processing write operations directed at addresses 202 and 204.

FIG. 5A illustrates two incoming write operations directed at addresses 202 and 204. Since these write operations are both addressed to the same memory bank (Bank C), the memory system cannot store both incoming data values into bank C. To resolve this problem, the intelligent memory controller 521 stores one of the data values into a different memory bank that has an unused memory location and updates an address mapping table 523 to reflect a new physical address for the data associated with that virtual address. Thus, FIG. 5B illustrates the intelligent memory system 500 after processing the write operations directed at addresses 202 and 204. The intelligent memory controller 521 stored the new data for address 202 in the same location (in Bank C) but the new data for address 204 was written into a new location in Bank E. The intelligent memory controller 521 updates the address mapping table 523 to reflect the new physical location of the data for virtual address 204. When read operations are received, the intelligent memory controller 521 will always consult the address mapping table 523 to determine the current physical location of the requested data value and respond appropriately.

FIGS. 5A and 5B illustrate one possible intelligent memory method that can handle two write operations simultaneously by using the larger physical memory address space (the extra memory bank) to hide the effects of any potential memory bank conflicts of two simultaneous write operations. Other intelligent memory methods use extra memory space and state information to implement other methods that improve the overall memory performance. For example, another intelligent memory system may use extra memory to encode a second copy of each data item stored in the memory system such that the memory system can handle two simultaneous read operations. Additional information on intelligent memory systems can be found in the patent applications "SYSTEM AND METHOD FOR STORING DATA IN A VIRTUALIZED HIGH SPEED MEMORY SYSTEM" filed on Sep. 8, 2009 having Ser. No. 12/584,645; "SYSTEM AND METHOD FOR STORING DATA IN A VIRTUALIZED HIGH SPEED MEMORY SYSTEM" filed on Dec. 15, 2009 having Ser. No. 12/653,660; "SYSTEM AND METHOD FOR REDUCED LATENCY CACHING" filed on Dec. 15, 2009 having Ser. No. 61/284,260 which are hereby incorporated by reference in their entirety.

Hierarchical Intelligent Memory Systems

As disclosed with reference to FIG. 4 and illustrated with the example of FIGS. 5A and 5B, intelligent memory logic can be used to construct memory systems that provide an overall memory performance that is better than standard memory systems constructed from the same fundamental memory cell circuits. Specifically, implementing an intelligent memory system can allow more than one memory operation to be handled simultaneously by the intelligent memory system.

As illustrated in FIGS. 5A and 5B, an intelligent memory system may constructed by combining intelligent memory control logic 521 along with independent memory banks (often including extra memory banks). Each of these independent memory banks within an intelligent memory system are stand alone memory systems for storing information. These independent memory banks within an intelligent memory system may be constructed with traditional memory system design techniques. However, the teachings of intelligent memory systems can also be applied to the independent memory banks within an intelligent memory system. Specifically, each of the independent memory banks may be implemented as an intelligent memory system in order to achieve improved memory system performance for the independent memory banks.

Figure 6A:
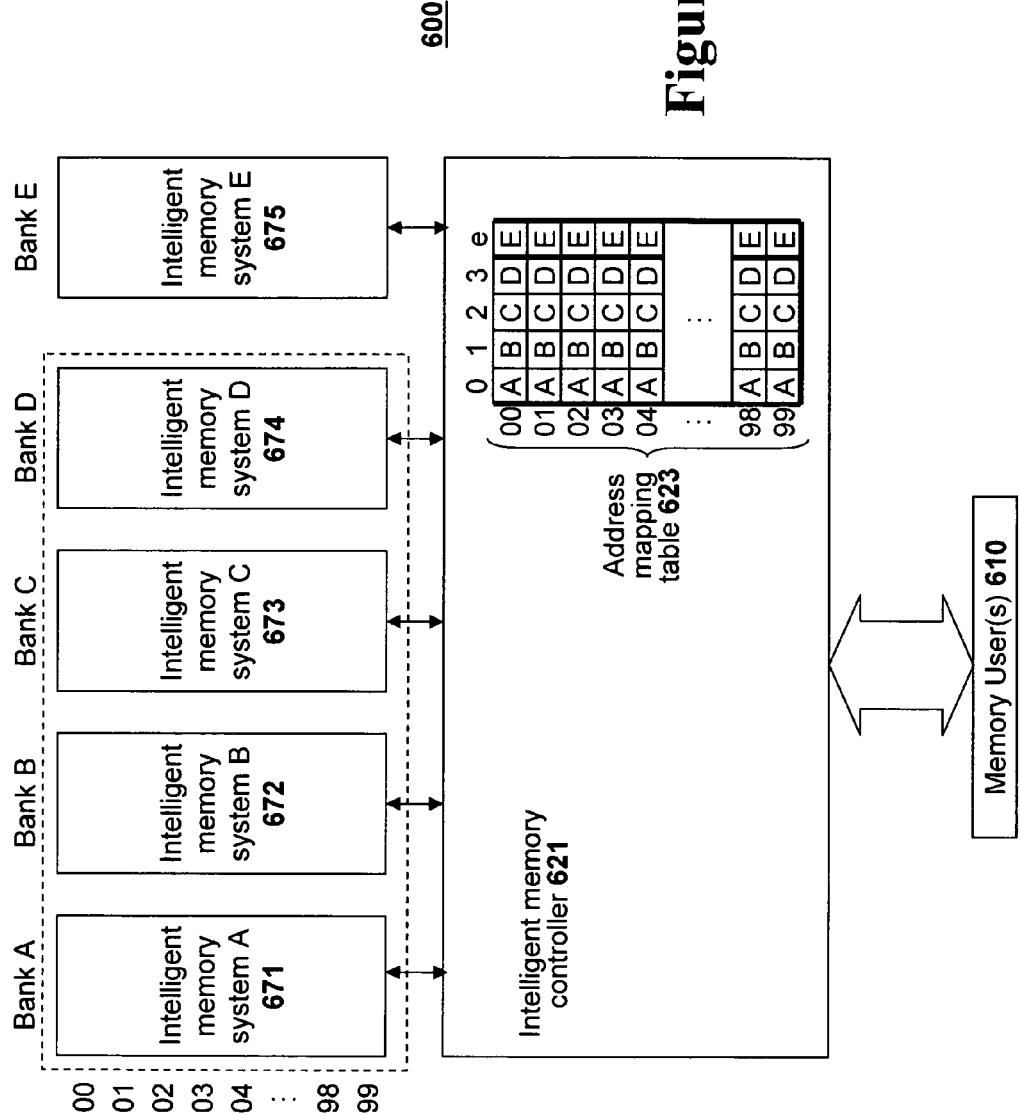
FIG. 6A illustrates a block diagram of a hierarchical intelligent memory system that includes internal memory banks implemented with an intelligent memory system.

FIG. 6A illustrates an example of an intelligent memory system 600 using the teachings of FIGS. 4 to 5B. Since the intelligent memory system 600 uses the teachings of FIGS. 4 to 5B, the high-level architecture of intelligent memory system 600 is capable of handling two simultaneous write operations. However, the intelligent memory system 600 differs from the intelligent memory system of FIGS. 4 to 5B in that each of the independent memory banks (banks A 671, B 672, C 673, D 674, and E 675) are also intelligent memory systems that provide improved memory system performance. The memory system 600 that is an intelligent memory system constructed with internal memory banks that are also intelligent memory systems may be referred to as a hierarchical intelligent memory system. A hierarchical intelligent memory system can synergistically provide a combination of the features of the intelligent memory systems used to construct the hierarchical intelligent memory system.

For example, referring to FIG. 6A, the memory banks 671 to 675 may be implemented with an intelligent control system that allows memory banks 671 to 675 to each handle two simultaneous read operations. By constructing an intelligent memory system 600 that can handle two simultaneous write operations with internal intelligent memory banks (671 to 675) that can each handle two simultaneous read operations, the resulting overall hierarchical intelligent memory system will be able to handle two write operations and two read operations simultaneously. Note that the conceptual diagram of FIG. 6A omits several details needed to fully construct a two write and two read hierarchical intelligent memory system. The full details can be found in the patent application entitled "HIGH SPEED MEMORY SYSTEMS AND METHODS FOR DESIGNING HIERARCHICAL MEMORY SYSTEMS" filed on Aug. 17, 2010 and having Ser. No. 12/806,631 which is hereby incorporated by reference. By designing and constructing hierarchies of intelligent memory building blocks many different types of hierarchical intelligent memory systems may be constructed that offer a wide variety of high-performance memory features.

Intelligent memory systems may be used any place that a high-performance memory system is needed. For example, the address mapping table 623 in the intelligent memory controller 621 of FIG. 6A is actually a memory system used to store a mapping table. Thus, the address mapping table may also be implemented with an intelligent memory system 629 as illustrated in embodiment of FIG. 6B. Whether or not an intelligent memory system is actually used will depend upon whether the performance gains by obtained by implementing an intelligent memory system exceed the cost of implementing an intelligent memory system. As will be disclosed in a later section, address mapping tables are actually a very good candidate for being implemented with an intelligent memory system since address mapping tables must be accessed multiple times to handle incoming memory requests.

Automated Intelligent Memory Systems Design Overview

As disclosed in the preceding sections, intelligent memory systems can be used to construct memory systems that provide an overall memory performance that is better than standard memory systems constructed from the same fundamental memory cells. However, designing, constructing, and verifying an intelligent memory system is a non trivial task. Furthermore, it is not even easy for an integrated circuit designer to know when an intelligent memory system will provide a better solution than a traditional memory system. The decision of whether to use an intelligent memory system or a traditional memory system will depend upon a large number of factors. Thus, to simplify the task of working with intelligent memory systems, the present document discloses an automated system for determining when to use an intelligent memory system and for designing intelligent memory systems.

Figure 7:
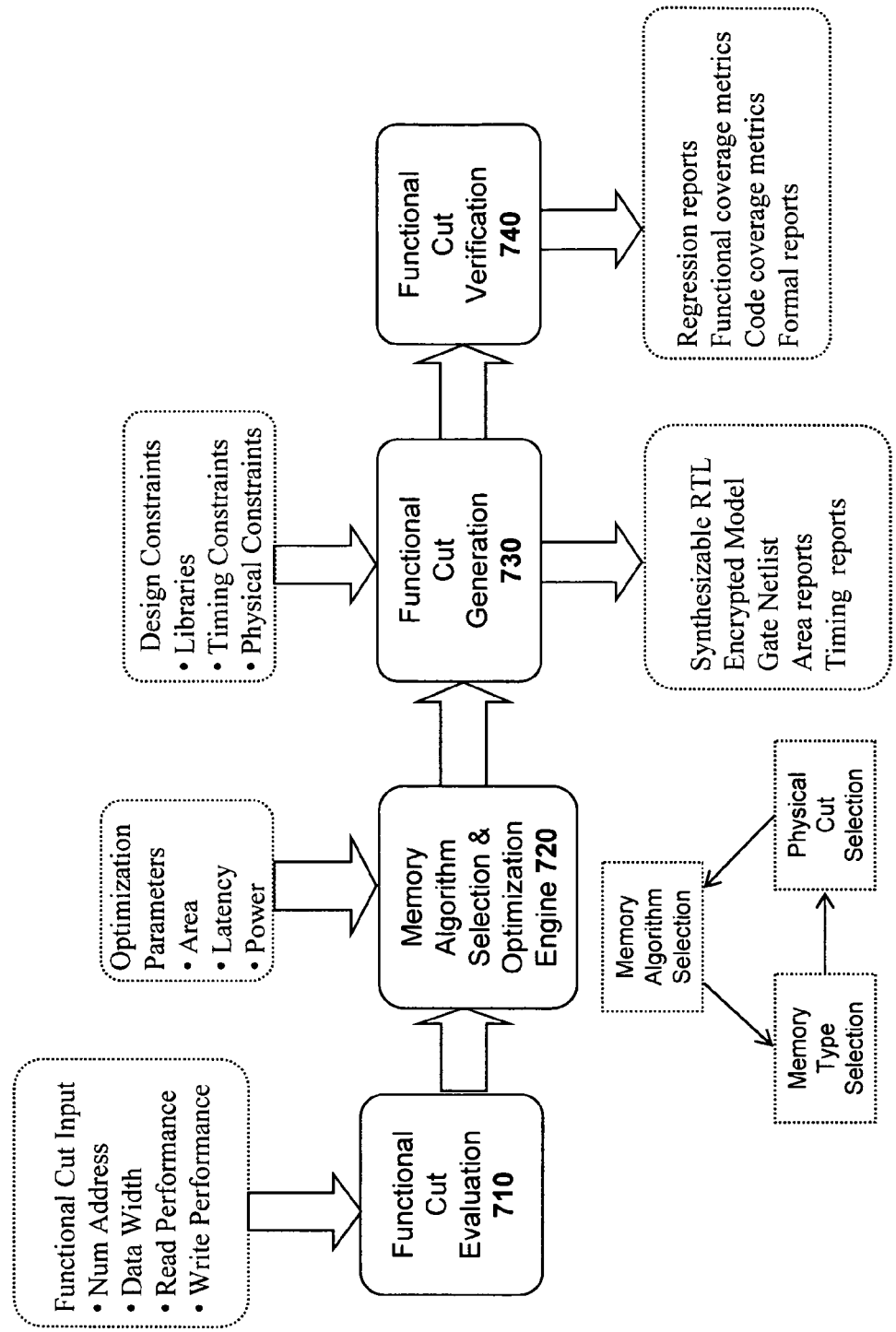
FIG. 7 illustrates a high-level diagram illustrated a series of stages handled by an automated memory design system.

FIG. 7 illustrates a high level flow diagram that presents the main processing stages of an automated memory design tool for designing intelligent memory systems. Each of these stages involves a fair amount of processing that is guided by information about the needed memory system and the particular integrated circuit manufacturing process that will be used.

The initial processing stage is a functional cut evaluation stage 710. An integrated circuit designer provides the automated memory design system with a detailed set of functional memory specification information that describes the functional characteristics of the desired memory system during the functional cut evaluation stage 710. The functional memory system characteristics may include the number of addressable memory locations, the data word width of each memory location, the read performance required, the write performance required, and any other requirements that define the desired memory system. The automated memory design system will evaluate the memory system functional characteristics provided by the user to ensure that the requested memory system is a valid memory system. The automated memory design system may also determine whether the requested memory system is within defined range of possible memory circuits for the particular manufacturing process and circuit library that the integrated circuit designer is using.

The functional cut evaluation stage 710 may also consider methods of transforming the requested memory functionality into a different memory functionality that can execute sequentially internally. For example, if a requested memory system must be able to handle two memory operations at a 500 MHz clock speed then the functional cut evaluation stage 710 may also decide to search for memory systems that can handle a single memory operation at a clock speed of 1000 MHz. If a memory system that operates at 1000 MHz clock speed can easily be constructed then additional logical may be added to have that 1000 MHz memory system handle two memory operations sequentially. The end result will be a memory system that appears to simultaneously handle two memory operations at a 500 MHz clock speed.

If the functional cut evaluation stage 710 determines that the requested memory system is valid and within a set of allowable ranges, then the automated memory design system proceeds to a memory algorithm selection and optimization stage 720. The memory algorithm selection and optimization stage 720 is a very processing intensive stage wherein the automated memory design system considers various different high-level designs for the requested memory system and parameter optimizations for each design considered. The memory algorithm selection and optimization stage 720 may be guided by a set of optimization parameters provided by the user that define certain memory system characteristics that the user would like optimized. The optimization parameters may include layout area, memory latency, power usage, and other characteristics of a memory system. The user may also specify limits to active power or dynamic power that should be considered. In some embodiments, the user may specify a particular memory type (single-port, dual-port, etc.) as an optimized parameter. This will have the automated memory design system generate at least one memory system using the specified memory type as long as such a memory system is possible.

The memory algorithm selection and optimization stage 720 may use a wide variety of techniques to determine the memory system designs that will be considered and the optimizations on the considered designs. An exhaustive brute-force approach may be used to try almost every possible memory system design. However, this may be impractical and various heuristics may be used to limit the search. For example, the functional characteristics defining memory systems may be divided into various ranges that are each handled differently. And brute-force systems may include various pruning heuristics that limit the search space of possible memory designs.

The memory algorithm selection and optimization stage 720 has a set of tools for handling different parts of memory algorithm selection and optimization process. A memory algorithm selection tool may be used to determine whether an intelligent memory system may be needed and which particular intelligent memory systems to consider. An intelligent memory system optimizer may be used to optimize the various parameters of a particular intelligent memory system that has been selected for possible use. A memory tile optimization tool may be used to optimize designs of traditional memory systems that may be used alone or within an intelligent memory system. Each of these subsystems will be described in later sections of this document.

After determining the potential memory system candidates, the memory algorithm selection and optimization stage 720 will present a set of proposed memory system designs to the integrated circuit designer. When an integrated circuit designer selects one of the proposed memory system designs, the system proceeds to a functional cut generation stage 730. The functional cut generation stage 730 generates the information needed to test the designed memory system within integrated circuit models and use the memory system within an integrated circuit design. An encrypted model may be provided to the integrated circuit designer for use within an integrated circuit model. Synthesizable Register-Transform-Logic (RTL) may be generated to create an RTL design for the proposed memory system. The RTL design will later be transformed into a geometric layout of the memory system. A physical layout area and interconnect netlist may be provided for integrated circuit layout planning.

Finally, a functional cut verification stage 740 may provide various information used to verify the selected memory system design. A formal verification may be provided of the memory system. A set of tests may be provided that will allow the created memory system to be fully tested.

Memory Algorithm Enumeration and Selection

As set forth in the preceding sections, there are several methods of constructing a memory system such as a traditional standard memory system, an intelligent memory system, and a hierarchical intelligent memory system. These memory systems differ in the type of algorithm used by the memory controller. Often, more than one different type of memory system design may be appropriate for a particular set of memory system requirements. To determine which type of memory system to construct, the automated memory design system may divide the selection into a two-stage process: potential memory algorithm enumeration and final selection of candidate memory systems.

In an initial memory algorithm enumeration stage, the automated system first determines the possible types of memory algorithms that may be used to satisfy the specified memory system performance requirements. For example, with a relatively simple set of performance requirements, the automated memory design system should consider several relatively simple memory algorithms such as various traditional memory system designs. However, if the requirements specify that the memory system must handle several simultaneous memory operations and only a relatively slow clock is available then the automated memory design system may eliminate the possibility of using a traditional memory system and enumerate a set of memory algorithms that may satisfy the requirements. At the end of the memory algorithm enumeration stage, the automated memory design system will have a set of memory system design types that can be used to meet the specified memory system performance requirements.

After enumerating the suitable memory system types (that implement various different memory algorithms), the automated memory design system then generates potential implementations of each of those possible memory system types. Specific performance and physical characteristics about each implementation that meets the specified memory system performance requirements will be stored as a candidate memory system for later analysis.

After generating various different implementations of each possible memory system type, the automated system then makes a final selection of the best candidate memory systems. The final selection among a set of potential candidate memory system designs that all fulfill the requirements will depend on the particular parameters that an integrated circuit wishes to optimize on. The automated memory system will present the integrated circuit designer with a set of the best candidate memory systems that were generated.

The automated memory design system will always consider using a traditional memory system since a traditional system will generally have the lowest latency and does not need to use any integrated circuit layout area on complex intelligent memory system logic. Note that special memory cells such as dual-port memory cells and two-port memory cells can provide a traditional memory system with special features. In addition to traditional memory systems with no additional digital logic, the automated memory design system will also consider memory systems with small amounts of additional digital logic to improve upon the basic traditional memory systems that are provided by a traditional physical compiler. The additional logic added to a traditional memory system may implement memory tile optimization or memory packing. These two techniques are described in greater detail in later sections.

Even when a traditional memory system can be constructed for a particular functional memory system request, that traditional memory system may not present the best solution. For example, a traditional memory system that operates at a high speed may be able to handle multiple memory requests received at a slower speed by sequentially handling the memory requests at a high speed internally. However, such a design may consume much more power than an intelligent memory system design that uses an intelligent method to handle the simultaneous memory requests. Thus, the automated memory design system will also enumerate a wide variety of intelligent memory system designs for consideration even when traditional memory system may be able to handle the task.

Some requested memory systems may have such difficult demands that those requested memory systems can only be constructed with a hierarchical intelligent memory system. For example, if several different memory operations must be handled simultaneously and there is only a relatively slow clock available then a hierarchical memory design may need to be implemented to handle the multiple memory operations simultaneously. Later sections in this document describes bottom-up and top-down techniques that can be used to design hierarchical intelligent memory systems that are needed to handle complex memory requirements such as handling multiple memory operations simultaneously.

The read latency requirement is an important metric considered by the memory algorithm enumeration stage. When read latency is not very important then the automated memory design system may consider complex hierarchical intelligent memory systems that require some time to operate but can provide overall memory through-put by handling multiple memory operations simultaneously. When read latency is moderately important then the automated memory design system may still consider intelligent memory by using the teachings in the U.S. Provisional Patent Application "SYSTEM AND METHOD FOR REDUCED LATENCY CACHING" filed on Dec. 15, 2009 having Ser. No. 61/284,260 which is hereby incorporated by reference. When read latency is very important then the memory system may not be able to consider complex intelligent memory system designs or will require high internal clock rates.

Complex memory system with tight latency requirements may be constructed by using multi-port memory cells that handle some of the extra features required. For example, a designer may need a memory system that can handle 2 write operations and 1 read operation (2W1R) simultaneously. Such a 2W1R memory system may be constructed by adding a single extra memory bank to handle the second write operation (as disclosed with reference to FIGS. 5A and 5B) and implementing the memory system with dual-port memory cells that can handle simultaneous read and write operations to handle the read operation. Thus, using two-port memory cells, a single layer intelligent memory system was able to handle three simultaneous memory operations. If only single port memory cells were used, the memory system would have required a hierarchical intelligent memory system to handle the three simultaneous memory operations. However, that hierarchical intelligent memory system may not have been able to meet the tight latency requirement.

Bottom-Up Approach to Hierarchical Memory Arrangements

Figure 6B:
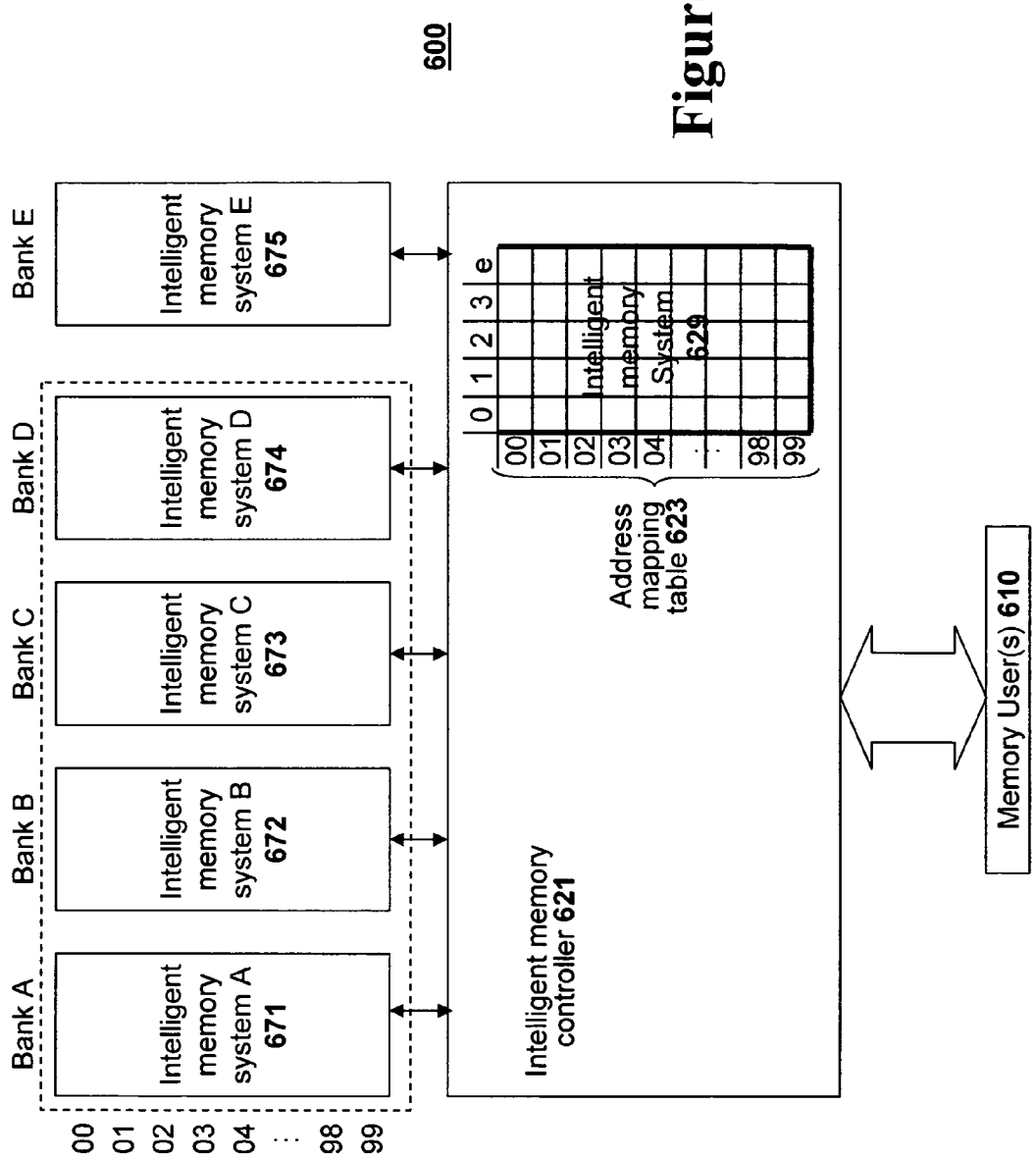
FIG. 6B illustrates the hierarchical intelligent memory system of FIG. 6A further including an intelligent memory system used as an address mapping table.

FIGS. 6A and 6B illustrated two examples of hierarchical intelligent memory system arrangements. By arranging intelligent memory systems in hierarchical arrangements, sophisticated memory systems with almost any combination of simultaneous read and write operations may be handled. For example, to construct a memory system that is capable of handling two simultaneous read operations and two simultaneous write operations (2R2W memory) one may construct a two write and one read (2W1R) memory system that uses two read and one write (2R1W) memories as internal memory banks. Alternatively, one may switch the arrangement and construct a 2R2W memory from a 2R1W memory that uses 2W1R memories as internal memory banks. Both of these hierarchical intelligent memory system arrangements are disclosed in detail in the related patent application "HIGH SPEED MEMORY SYSTEMS AND METHODS FOR DESIGNING HIERARCHICAL MEMORY SYSTEMS" filed on Aug. 17, 2010 and having Ser. No. 12/806,631.

Complex memory systems that can handle the same number of simultaneous read and write operations may be constructed in many different ways. FIG. 8A illustrates a chart with a horizontal axis specifying a number of simultaneous write operations supported and a vertical axis specifying a number of simultaneous read operations supported. Any intersection point on the graph represents a possible complex memory system that handles a specified number of read operations and write operations simultaneously. The memory systems that fall on the vertical axis also include the ability to alternatively handle a single write operation (to store data). Similarly, the memory systems that fall on the horizontal axis also include the ability to alternatively handle a single read operation (to retrieve data). The remaining memory systems are defined by the number of simultaneous read and write operations that can be performed. For example, position 848 specifies a memory system that can handle two read operations and two write operations simultaneously. The different memory systems depicted on FIG. 8A may be constructed with various different hierarchical intelligent memory system arrangements using simpler memory systems that are to the left of, below, or both to the left of and below a particular intersection point on the graph of FIG. 8A.

In the upper right, intersection location 890 represents a sophisticated memory system that supports four simultaneous read operations (vertical axis) and four simultaneous write operations (horizontal axis). That four read and four write memory system 890 may be constructed in a variety of different manners using less complex memory systems. Specifically, the four read and four write (4R4W) memory system of position 890 may be constructed from many different combinations of the memory systems that are either to the left of, below, or both to the left of and below intersection position 890 on the graph of FIG. 8A. Some examples are presented in the following paragraphs.

A first method of constructing a four read and four write memory system 890 is to construct a high-level intelligent memory block organization uses extra memory banks to support multiple write operations (four write operations in this example). This is represented on FIG. 8A by the horizontal dot-dashed line 811 to position 891 that represents an intelligent memory system that supports four simultaneous write operations. The individual memory banks within such an intelligent memory system may then implemented with organization that supports four read operations (such as an XOR-based intelligent memory block that supports multiple reads). The support of four read operations in this manner is represented on FIG. 8A by the vertical dot-dashed line 815 from position 891 to position 890 that represents the 4R4W memory system. Thus, the end result will be the overall memory system at intersection 890 that will handle four reads and four writes simultaneously.

A second method of constructing a four read and four write memory system 890 is to first start with an intelligent memory organization that handles four simultaneous read operations. This is represented on FIG. 8A by the vertical solid line 831 to position 892 that represents a memory system that supports four simultaneous read operations. The individual memory blocks within that high-level memory organization that handles four reads may be implemented with individual intelligent memory blocks that can handle four simultaneous write operations (such that the overall memory system will handle four reads and four writes simultaneously). The support of four write operations is represented on FIG. 8A by the horizontal sold line 835 to from position 892 to position 890 that represents the final 4R4W memory system.

The two preceding paragraphs illustrate two different methods of constructing an overall memory system will handle four reads and four writes simultaneously from simpler memory systems. However, there are many other methods of constructing the desired 4R4W memory system at position 890 by using other hierarchical structures that follow a path from the origin at position 820 to the desired 4R4W memory system at position 890 on FIG. 8A. For example, one possible arrangement may use a first memory organizational layer to create a 1 read and 1 write (1R1W) memory system as depicted by dashed diagonal line 861, a second memory organizational layer to implement three write operations as depicted by horizontal dashed line 862, and a third memory organizational layer to implement three read operations as depicted by vertical dashed line 863. Any path that originates at the origin 820 and progresses to the 4R4W position 890 along a path that goes up, right, or diagonal up/right depicts a possible memory system organization that achieves the desired 4R4W memory system at position 890. Note that not all of the transitions require intelligent memory systems. For example, the 1 read and 1 write (1R1W) memory system depicted by dashed diagonal line 861 may be implemented using a two-port memory cell circuit.

Since any path from the origin at position 820 to the representation of the 4R4W memory system at position 890 could be used to construct a 4R4W memory system, an exhaustive automated memory design system may consider every possible path. By considering every possible path, the automated memory design system can find the optimum memory design as measured by any relevant metric (power consumption, layout area, etc.).

Note that many memory system designs will follow the same path for a certain distance before diverging on the way to a destination memory system. Therefore, the partial results along that common path before diverging can be used when analyzing other paths that follow the same common path before departing along a different path to the destination memory system. To best take advantage of this fact, one method of designing a desired memory system is to start at origin position 820 and then expand upward and rightward toward the desired memory system while storing partial results for every possible sub memory system that may be constructed along the path to the desired final memory system. Such an automated memory design system would explore every possible simpler memory system that may be used to construct the final desired memory system in some complex hierarchical intelligent memory system arrangement. FIG. 8B illustrates how an automated memory design system may start by designing relatively simple e intelligent memory systems near the origin 820 while progressing ultimately towards a desired final hierarchical memory system.

For example, to create the 4R4W memory system at position 890 on FIG. 8B, an automated memory design system may first optimize methods of creating a one read operation (or one write operation) memory at position 841 and the one write operation (or one read operation) memory at position 842. These two positions are basically the same and just represent a typical one port memory cell. The automated memory design system may then determine optimized methods of creating a one read and one write (1R1W) memory at position 843. The 1R1W memory at position 843 can be created with an intelligent memory system which uses the basic single port memory cell of positions 841 and 842. This completes optimizing the memory systems in the defined area 871.

The automated memory design system then expands outwards towards the ultimate goal of a 4R4W memory system at position 890. Specifically, the automated memory design system considers optimized designs for the memory systems in the defined area 872. The automated memory design system may first optimize 2 read (or 1 write) memories at position 844 that may be created from memory at position 841 or 820. Next, the automated memory design system may optimize the 2 write (or 1 read) at position 845 that may be created from memory at position 842. (This type of memory system may be constructed using the teachings of FIGS. 5A and 5B.)

The automated memory design system may then optimize the 2 read and 1 write (2R1W) memory at position 846 that may be created from various combinations of memories at positions 841, 842, 843, and 844 (all the memory systems that are depicted to the left of or below the 2R1W memory at position 846). Next, the automated memory design system may optimize the 1 read and 2 write (1R2W) memory at position 847 that may be created from various combinations of memories at positions 841, 842, 843, and 845 (all the memory systems that are depicted to the left of or below the 2R1W memory at position 847). Note that as each more complex memory system is optimized, the results from the previous optimizations of simpler memory systems will be stored and used in later optimizations since those simpler memory systems may be used to create the more complex memory systems.

The 2R2W memory at position 848 is the final memory system within defined area 872. The automated memory design system may optimize the 2R2W memory at position 848 that can be created from many different combinations of the previously optimized memory systems at positions 841 to 847 on the graph of FIG. 8B.

After completing all of the memory systems within defined area 872, the automated memory design system will then optimize the memory systems in the defined area 873 as it progresses out toward the requested 4R4W memory system at position 890. The memory systems in the defined area 873 will be optimized in the same manner as the memory systems in the defined area 872 wherein the results of each memory system optimization are stored and the results are used in later optimizations. Finally, the automated memory design system will optimize the memory systems in the defined area 874 ending with the desired 4R4W memory system at position 890. When the automated memory design system reaches the 4R4W memory system at position 890, the results from all of the earlier optimized memory systems will be used to optimize the 4R4W memory system at position 890. Thus, the final result of the automated memory design system will be a number of different optimized hierarchical memory system designs achieve the desired functionality of the desired 4R4W memory system at position 890. The integrated circuit designer may consider and select from the different optimized hierarchical memory system designs.

The method described above sets forth an exhaustive bottoms-up approach that would consider all (or almost all) possible hierarchical intelligent memory system combinations to create a desired complex memory system that can handle several simultaneous read operations and write operations. However, many implementations of an automated memory design system would use various pruning mechanisms to simplify the search for hierarchical memory system designs. For example, one system may simply consider the two paths along the outer bounds of the various paths to the desired memory system since these paths often yield the best results. For example, an automated memory design system designing a 4R4W memory system at position 890 as illustrated in FIG. 8A may only consider the 811 and 815 path or the 831 and 835 path to 4R4W memory system at position 890. Other systems may consider those two paths plus other paths that take advantage of special memory cells such as dual port memory cells.

Top-Down Approach to Hierarchical Memory Arrangements

Instead of the bottom-up approach set forth in the previous section, an automated memory design system may consider a 'top-down' memory system design approach. With a top-down approach, the system would start with the final memory system requirements and work toward the ultimate fundamental memory cell that would be used to implement the memory system. For example, referring to FIG. 8A, when designing the 4R4W memory system at position 890, the automated memory design system would start at position 890 and work toward a fundamental memory cell.

With a top-down design approach, the automated design system should be very intelligent in pruning paths that are not likely to yield good results. When using a top down approach, many cases may be "good enough" such that it is not necessary to always check all possible combinations of paths.

Whether using a bottom-up or a top-down approach, the automated memory design system may be given enough hints so the automated memory design system can consider the paths that will give best solution without exhaustively searching the design space. For example, consider the following case with eDRAMs. Some eDRAMs come with a multi stage memory interface with various limitations. For example, one particular eDRAM memory macro allows 4 accesses to different banks. By providing knowledge of such a four access memory being available for use, a top down or bottom up memory compiler can look at building a 4W/1R memory directly since the write banks can always be load balanced. Similarly, that 4 access eDRAM memory can be used to construct a 3W1R memory system directly. Those 4W/1R or 3W1R memory systems may directly be used as a building block in a more complex intelligent memory system. Thus, if a designer requests a five write (5W) memory system then the automated memory design system may use the 4W/1R fundamental building block. Thus, to construct the five write (5W) memory system, the automated memory design system may simply add another bank to the 4W/1R fundamental building block.

Other Memory Access Combinations

The bottom-up and top-down memory design systems disclosed in the previous section were described using a two dimensional graph that depicted a number of simultaneous read operations (vertical axis) AND simultaneous write operations (horizontal axis). However, this was done to simplify the explanation. Complex memory systems may also be constructed using different combinations of simultaneous read operations AND/OR simultaneous write operations.

FIG. 8C illustrates a different combinations of simultaneous read operations (vertical axis) OR simultaneous write operations (horizontal axis). Any intersection point on the graph of FIG. 8C represents a possible complex memory system that handles a specified number of read operations OR write operations simultaneously. For example, position 899 represents a memory system that can handle 5 read operations OR 5 write operations. As with FIG. 8A, a memory system on FIG. 8C can be constructed from various combinations of memory systems that are to the left, below or both two the left and below of the memory system.

In addition to the relatively simple memory systems of FIGS. 8A and 8B, many other memory systems with esoteric memory access abilities may also be created. For example, a complex memory system may be designed to perform the following in a single cycle: (3R1W) OR (2R2W) OR (1R3W) OR (4W). Such a memory system performs any combination of four memory operations except four simultaneous read operations (4R). Such complex memory systems can be created with hierarchical arrangements of simpler intelligent memory systems.

Optimization of a Selected Intelligent Memory Design

Each different intelligent memory design that may be used has several design parameters that may vary with different implementations of that intelligent memory design. For example, referring back to FIG. 5A, the example intelligent memory system 500 provides 400 addressable memory locations using four memory banks that each contains 100 individual memory locations each (plus an additional 100 memory location bank to handle memory bank conflicts). However, the same functional memory system could be constructed with eight memory banks that each contains 50 memory locations (plus an extra memory bank with 50 memory locations). Or the same functional memory system can be constructed with five memory banks that each contains 80 memory locations (plus the extra memory bank).

In each of these different implementations of the same basic intelligent memory system design illustrated in FIG. 5A, the size of the address mapping table 523 will also vary accordingly. Since the address mapping table 523 may be implemented in SRAM in order to achieve the needed performance, increasing the size of the address mapping table 523 will increase the layout area and power requirements of the memory system design (since SRAM uses more layout area and power than DRAM).

Each of these different possible implementations of the same intelligent memory system design will provide the same net functional memory system. However, each of these different possible implementations will have a different set of operational and physical characteristics that define the specific implementation. These characteristics will include the layout area, the power consumption, and the latency. An integrated circuit design may wish to optimize a memory design on one or more of these characteristics.

To optimize on the various memory characteristics, a set of mathematical formulas can be used to determine the memory system characteristics based upon different design parameter selections. For example, a formula that determines the integrated circuit lay out area required based upon the number of memory banks used and the size of each memory bank may be defined. (Note that this formula must also take into account the size of any address mapping table in the memory controller.) Then, if a user wishes to optimize the memory system design for lay out area size, the minima for that particular formula can be determined. Similar formulas can be determined for all of the other memory characteristics that a designer may wish to optimized on.

Thus, for each different intelligent memory design type, the automated memory design system will have a set of mathematical formulas that may be used to calculate different output characteristics of the memory system given a particular set of input parameters. Based upon which output characteristics the designer is most interested in, the automated memory system can determine the best solutions for the designer by minimizing or maximizing (which ever is optimal) the output of the relevant formula. Thus, the optimizer will determine the best memory system design parameters that both meet the memory system requirements and optimize the characteristics that the designer most desires.

Memory designers may wish to optimize on more than just one particular memory system characteristic. In such cases, the memory system optimizer may determine the best implementations for each of these desired characteristics and also generate a set of implementations that provide a balanced set of optimizations.

Memory Tile Optimization

Existing physical memory compilers sometimes tend not to be very efficient at creating optimal memory module designs. One reason is that existing physical memory compilers tend to not be very efficient is that existing physical memory compilers often take memory module requests literally. Thus, if an integrated circuit designer requests a memory module with a specific data word width and data depth, the physical memory compiler will attempt to provide the integrated circuit designer with a physical memory module with the specifically requested physical data width and data depth.

To improve upon the existing physical memory compilers, the system of the present disclosure may perform "memory tile optimization" that uses information and memory module designs from existing physical memory compilers but creates more optimized final memory systems. Memory tile optimization operates by carefully examining the individual memory modules that a physical memory compiler may generate but then combines those memory modules (which may be viewed as individual "memory tiles") together with additional circuitry to create final memory systems that provide a desired memory functionality instead of creating individual memory modules of a particular requested size.

Note that some physical memory compilers may already be highly optimized or fully optimized such that it provides optimal memory solutions. With a fully optimized physical memory compiler, the memory tile optimizer will not be needed. If a physical memory compiler is highly optimized (but not fully optimized), the memory tile optimizer may search for alternative solution but will often select the solution provided by the physical compiler when it is directly requested to provide a solution. If a physical memory compiler is not optimized then a memory tile optimizer will improve most memory system designs.

Figure 9:
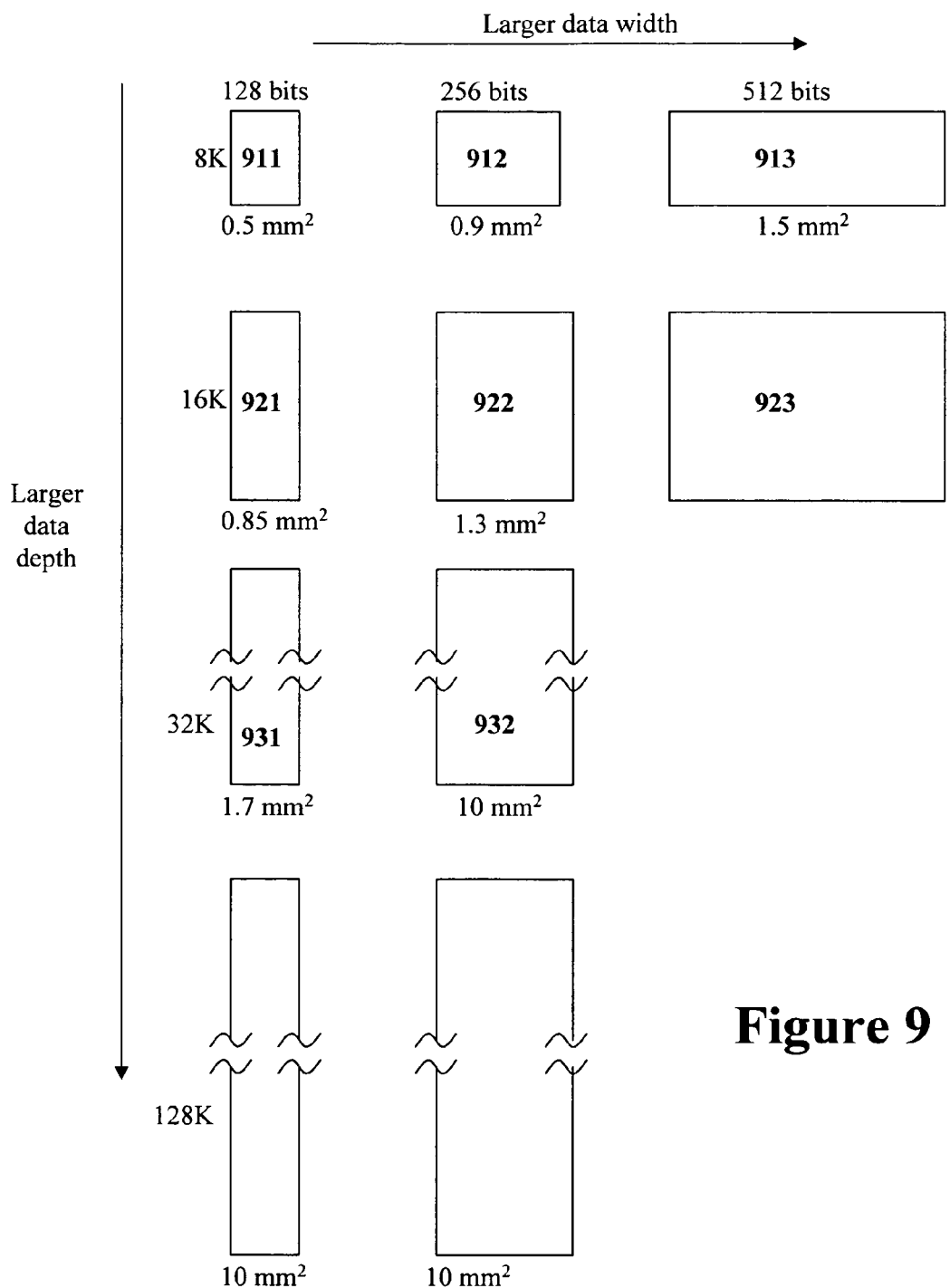
FIG. 9 illustrates a set of different memory modules that a physical compiler may have available to an integrated circuit designer.

FIG. 9 illustrates a set of different memory modules that a physical compiler may have available to an integrated circuit designer. The various memory modules illustrated in FIG. 9 may be analogized with tiles since each memory module has a particular physical length, width, and corresponding layout area. In addition to the physical size characteristics, each memory module has various operational and performance characteristics such as the data word width, the data capacity (data depth), maximum operating speed, power requirements, etc.

When an integrated circuit designer wishes to create a memory module for an integrate circuit, the integrated circuit designer will have a set of required functional characteristics (data width, data depth, operating speed, etc.) for the desired memory module. The integrated circuit designer will also generally have a set of characteristics that the integrated circuit designer would like the memory module optimized for (layout area, power usage, etc.). The optimization parameters will vary depending on the requirements. For example, an integrated circuit for a battery-powered mobile device may need to be optimized for power consumption or an integrated circuit that is low on layout area may need to be optimized for memory module area. However, an integrated circuit designer generally does not care exactly how a memory system is actually constructed as long as the memory system provides the required functional characteristics. A memory tile optimizer takes advantage of this fact by considering the entire library of memory modules available in order to construct a memory system with needed functional characteristics instead of just a few memory modules that closely meet the specified requirements.

Memory tile optimization is best illustrated by example. If an integrated circuit designer needs a memory module that handles 256-bit wide data words and is 32K data word entries deep (a 32K×256 bit memory module), then a physical memory compiler may examine its database and select a 32K×256 bit memory module tile for that integrated circuit designer. However, this solution may not be optimal for many different reasons. There are many memory module characteristics that follow non linear patterns within set of available memory modules. For example, referring to FIG. 9, the layout area used by each different memory modules does not linearly correspond to the memory capacity of the memory module. Referring to the first row in FIG. 9, memory module 912 has twice the memory capacity of memory module 911 but is not twice the size in physical layout area. Similarly, memory module 913 has four times the memory capacity of memory module 911 but is only 3 times the size in physical layout area. Similar non linear aspects may also exist with respect to power usage, operating speed, and other memory system characteristics. Thus, to create better memory systems, a memory tile optimizing system will consider a large number of alternative methods of creating a memory system with a specified set of functional characteristics instead of just selecting a physical memory module that closely matches the requested characteristics.

To create the requested 32K×256 bit memory module, a memory tile optimizer will consider the native 32K×256 bit memory module 932 but the memory tile optimizer will also consider many combinations of other memory modules that provide the same desired memory system functionality. For example, four of the 8K×256 bit memory modules 912 may be combined together to create a 32K×256 bit memory module. Eight of the 8K×128 bit memory modules 911 may be combined together to create a 32K×256 bit memory module. Two of the 16K×256 bit memory modules 922 may be combined together to create a 32K×256 bit memory module. Two of the 32K×128 bit memory modules 931 may be combined together to create a 32K×256 bit memory module.

These combinations (and other combinations) will generally require some additional multiplexors, addressing circuitry, or other support circuitry to combine the different memory modules in a manner that provides the exact same memory system functionality as the requested 32K×256 bit memory module. However, the additional support circuitry that is required to combine the various memory modules together is generally trivial. For example, combining two 32K×128 bit memory modules 931 to create a 32K×256 bit memory system merely consists of wiring the two 32K×128 bit memory modules in parallel. Combining two 16K×256 bit memory modules 922 together to create a 32K×256 bit memory module merely consists of using one address line to select between one of the two 16K×256 bit memory modules.

Each of the different memory tile combinations to create a desired memory system functionality will generally have different set of physical and operating characteristics. The memory tile optimizer may select a memory module combination that provides the needed memory system functionality and provides the best characteristics for metrics that the designer wanted optimized. If the designer wanted to optimize several different characteristics, the tile optimizer may present multiple memory system candidates and allow the integrated circuit designer to select one of the memory system candidates.

When an extra banks are added to a memory system to implement an intelligent memory system (such as extra banks and macros that may be needed to create a 2R2W system), the tile optimizer should take into account the additional banks (or macros) that are being added. These additional memory banks may change the way the tile optimizer selects memory since the memory needs have changed.

Memory Packing Optimization

The memory tile optimization system considers the entire library of memory modules available from physical compiler in order to consider different ways of constructing a memory system with a set of specific functional characteristics from smaller memory tiles. A memory packing optimizer performs a similar function but in different manner. A memory packing optimizer examines whether a wider data word memory module can be used to provide a particular requested memory functionality for a smaller data word by packing multiple smaller data words into the wider data word memory module.

Memory packing can be best disclosed through an example. An integrated circuit designer may need a 16-bit wide memory that has 8K of storage locations (an 8K×16 bit memory module). If an integrated circuit designer requests an 8K×16 bit memory module from a physical memory compiler, the physical memory compiler will typically provide the user with a physical design for a memory module that literally has 8K×16 bit memory array. However, there are many other methods of providing the same 8K×16 bit memory system functionality.

As set forth in the section on tile optimization, the same 8K×16 bit memory functionality may be provided by using two 8K×8 memory modules along with a small amount of additional logic. A memory packing optimizer will consider methods of providing the same 8K×16 bit memory functionality with memory modules having wider data words. For example, a memory packing optimizer may propose a memory system that provides the functionality of an 8K×16 bit memory module using a 4K×32 bit memory module since the 4K×32 bit memory module provides the same amount of total memory storage capacity. Specifically, the memory packing compiler may place two 16-bit wide data items into each 32-bit word of the 4K×32 memory. Similarly, a memory packing optimizer may place four 16-bit wide data items into each 64-bit word of a 2K×64 memory module, it may place eight 16-bit wide data items into each 128-bit word of a 1K×128 memory module, or it may use some other permutation of placing 16-bit words into a memory module with a wider data word.

However, memory packing optimization is not as simple as memory tile optimization. To create the same memory functionality as an 8K×16 bit memory module with two 8K×8 bit memory modules, a memory tile optimization system merely has to wire the two 8K×8 memory modules in parallel. Specifically, the same address lines are routed to the both 8K×8 bit memory modules but 8 bits of data are routed to one 8K×8 bit memory module and the other 8 bits of data are routed to the other 8K×8 bit memory module. A memory packing optimizer must provide more complex logic that handles the packing multiple smaller data words into a single larger data word of the physical memory module.

Some memory modules provided by a physical memory compiler may provide sub-word access features. Sub-word access features allow an integrated circuit designer to read and write individual sub-sections of any data word entry. When sub-word access features are available, the memory packing optimizer can use the sub-word access features for packing multiple data times into a single data word. Referring back to the example of creating the functionality of an 8K×16 bit memory module, if a 4K×32 bit memory modules has sub-word access that allows 16 bits of data to be read/written individually from each 32-bit word then that sub-word access feature may be used to create the functionality of an 8K×16 bit memory module. Specifically, all of the address lines but one will be coupled to the 4K×32 bit memory module to select one of the 32-bit words in the 4K×32 bit memory module. That last address line may then be used to select whether the upper or lower 16-bit sub-word of the 32-bit word should be accessed thereby creating a memory system with 8K×16 bit functionality from a 4K×32 bit memory module.

However, sub-word access is not always available in all memory modules. Furthermore, even when sub-word access is available, it may not always be available in the alignment or granularity that is needed. For example, an integrated circuit designer may need a memory module that stores 12K of 41-bit words. A typical physical compiler will not handle such an unusual request well. A physical compiler may suggest using a 12K×64 memory wherein 41 bits of data are stored in each 64-bit word and 23 bits of each 64-bit data word are just ignored. Wasting such a large amount of data storage (12K×23 bits) is clearly not very efficient. A memory tile optimizer may suggest creating a memory system using a 12K×32 memory module (that stores 32 bits of the data) and a 12K×16 memory modules that stores 9 bits of data in each 16-bit entry (with 7 bits wasted). That memory tile optimizer solution will waste only 12K×7 bits of data which is an improvement over the physical compiler solution that wasted 12K×23 bits. However, a memory packing optimizer may suggest storing three 41-bit data items within each 128-bit data word of a 4K×128 memory module. In such an embodiment, each 128-bit data word will store three 41-bit data items (for a total of 123 bits of data per entry) and have 5 extra data bits that are wasted. However, wasting only 4K×5 bits is a significant improvement over both the physical compiler solution and the memory tile optimizer solution. But a significant problem is that most memory systems will not allow reading and writing of just specific 41 bits within a 128-bit data word.

This problem may be resolved by adding extra digital logic to the 4K×128 bit memory module to handle the reading and writing of 41 bit data items that are packed in the 128 bit words. For read operations, the additional digital logic circuitry needs to read the appropriate 128-bit data word, access the proper 41 bit subset from the 128 bit word, and respond with that 41 bit data word. For write operations to the memory module, the situation is much more difficult.

For a standard write operation into a memory module storing packed data at fixed memory locations, the additional circuitry needs to first read the appropriate 128-bit data word, mask the new data bits into the appropriate 41-bit subset of the 128 bit data word, and then write back the changed 128 bit data word that includes the 41 bits of new data and 82 bits of existing data from the other data words in the same 128 bit data word entry. The digital logic required to perform these packing steps is not very complex. However, with a standard memory system the write operation presents a difficulty since the write operation requires the digital logic to read the appropriate data word, modify the data word at its fixed location by masking in the new data, and write the modified data word back into the appropriate entry for the memory module. Specifically, the requirement of performing both a memory read operation and a memory write operation any time an external memory user needs to write to the memory means that memory system must operate twice as fast internally (an internal read and write must be performed for every write operation received). Therefore, if a standard memory system is implemented then memory packing can only be used when a suitable sub-word ability is available or the internal memory can operate twice as fast as memory operations are received.

However, various intelligent memory system designs (As disclosed in related patent applications that have been incorporated by reference) can be used to implement memory packing systems at slower clock speeds. For example, if an intelligent memory system design implements a 1R1W memory system (or a read-modify-write memory) by using an address mapping table along with an extra memory bank or cache, then the system can handle a write operation to the packed memory system every clock cycle although there may be a two cycle latency period for each write operation. In a first clock cycle, a 1R1W memory system receiving a write request will first read the relevant memory system entry. Then in a second clock cycle, the 1R1W memory system will write back a modified version of the entry that contains the new data. (Note that while this write occurs, the system may begin handling a subsequent write operation by performing a read of the appropriate memory system entry for that subsequent write operation.)

Recursion

The automated systems for designing memory systems disclosed in this document can be used to generate intelligent memory system designs that combine a particular data storage method with an internal memory space. For example, FIG. 4 illustrates a high-level block diagram of an intelligent memory system that is constructed using intelligent memory method logic 430 and internally addressable physical memory 420 that is used by the intelligent memory method logic 430. The internal memory within an intelligent memory system is itself an independent memory system. For example, the intelligent memory system 500 illustrated in FIG. 5A is constructed with five independent memory banks (banks A, B, C, D, and E). Therefore, it is possible to call the automated system for designing memory systems recursively to design memory systems for use within an intelligent memory system.

For example, if an automated memory design system selected the intelligent memory system 500 as a candidate memory system design for a particular memory application, the automated memory design system could recursively call itself to design memory systems for the internal independent memory banks (banks A, B, C, D, and E). The automated memory design system would then create the memory systems based on a set of supplied memory system requirements. The automated memory design system may select a traditional memory system such that the final design would appear as in FIG. 5A. However, depending on the requested memory requirements and optimization parameters, the automated memory design system may select an intelligent memory design for the internal memory banks such that the final design may appear as illustrated in FIG. 6A where each of the five independent memory banks (banks A 671, B 672, C 673, D 674, and E 675) are implemented as intelligent memory systems thus creating a hierarchical intelligent memory system.

One difficulty with having an automated memory design system recursively call itself to design internal memory systems is that each new intelligent memory system layer adds some latency to the overall response time. Referring to FIG. 6A, the intelligent memory system 600 operates by having the intelligent memory controller 621 first look up the current physical location of a requested memory address in the address mapping table 623. After determining current physical location of requested memory location, the intelligent memory controller 621 then accesses the location that is within one of the five independent memory banks (banks A 671, B 672, C 673, D 674, and E 675). The time required to perform the physical address look-up within address mapping table 623 before actually accessing the requested data in one of the memory banks introduces some latency into the memory system 600.

If the five memory banks (banks A 671, B 672, C 673, D 674, and E 675) are implemented with a similar intelligent memory system design, then the access into one (or more) of those memory banks will add additional latency to the performance of the overall memory system. Specifically, the memory system would perform two sequential address mapping table look-ups before accessing the actual data that was requested (a first look-up in address mapping table 623 and a second look-up in an address mapping table within the selected memory bank). The latency from these two hierarchical arranged intelligent memory systems is acceptable in many applications considering the fact that in exchange for this latency, the hierarchical memory system may be able to handle several independent memory operations simultaneously.

One particular area where the technique of recursion has been found to be quite useful is for optimizing address mapping look-up tables that are used within intelligent memory systems. Referring back to the example of FIG. 5A, the intelligent memory system 500 receives two write operations: a write to address 202 and a write to address 204. To handle these two write operations, the intelligent memory controller 521 makes several different accesses into the address mapping table 523.

Responding to the write requests to address 202 and address 204, the intelligent memory controller 521 makes a first read into the address mapping table 523 to determine the current physical location of address 202 and a second read to determine the current physical location of address 204. In the situation of FIG. 5A, address 202 and address 204 are currently located in the same memory bank (bank B) thus causing a potential memory bank conflict that must be avoided by moving one of the two data items. Thus, the intelligent memory controller 521 reads the address mapping table 523 to locate a free memory location for one of the write operations (the write to address 204 in this example). (In some embodiments, this read is not necessary since the entire 204 row of address mapping table may be read out when locating the physical location of address 204.)

After writing the new data into the appropriate locations of the memory banks, the intelligent memory controller 521 updates the address mapping table 523 by writing the new physical location of the data associated with address 204 into the address mapping table 523 and marks the previous location as now empty. As set forth in this example, several accesses to the address mapping table 523 must be performed to handle the incoming write requests (at least two read operations and one write operation). To handle all of these accesses into the address mapping table efficiently, several of these memory accesses into the address mapping table 523 should be handled simultaneously. Thus, the address mapping table 523 is an ideal candidate for using various intelligent memory system designs that handle simultaneous memory operations.

To implement an address mapping table 523 with an intelligent memory system design, the automated memory design system may recursively call itself with the desired functional characteristics for the address mapping table 523. Specifically, the automated memory design system is provided with the needed size of the address mapping table 523 and the needed read and write performance. For example, the automated memory design system may call itself recursively to generate a memory system that is the size of the address mapping table 523 and can handle 2 read operations and one write operation (2R1W) simultaneously. To handle the two read operations simultaneously, the address mapping table 523 may be duplicated such that each of the two instances then only needs to handle 1 read operation and 1 write operation (1R1W) simultaneously.

As noted earlier, if an address mapping table is implemented with an intelligent memory system then that intelligent memory system itself will introduce additional latency to the system. Thus, the maximum allowed latency is an important metric that should be provided when calling the automated memory design system to design an address mapping table. If implementing the address mapping table with a standard intelligent memory system adds too much latency then the automated memory design system may propose using a reduced-latency intelligent memory system. To achieve the increased latency performance, reduced latency intelligent memory systems usually have higher layout area overhead than standard intelligent memory system. This increased layout area must be considered in view of the memory system requirements (which may specify a maximum layout size). If no intelligent memory system will satisfy the latency requirements then the automated system will then generally suggest a traditional high-speed memory system (such as an SRAM) for the address mapping table.

When an address mapping table is implemented with an intelligent memory system that can handle multiple simultaneous operations, then address mapping table may be implemented with higher density but slower speed memory since the ability to handle several simultaneous memory makes up for the slower speed. Thus, using an intelligent memory system design may allow an address mapping table to be implemented eDRAM instead of high-speed SRAM. The DRAM-based intelligent memory system implementation may use substantially lower layout area due to the much higher memory density of DRAM memory cells. Furthermore, the DRAM implementation may use much less power than a SRAM address mapping table.

Automated Intelligent Memory Design Implementations

Figure 10:
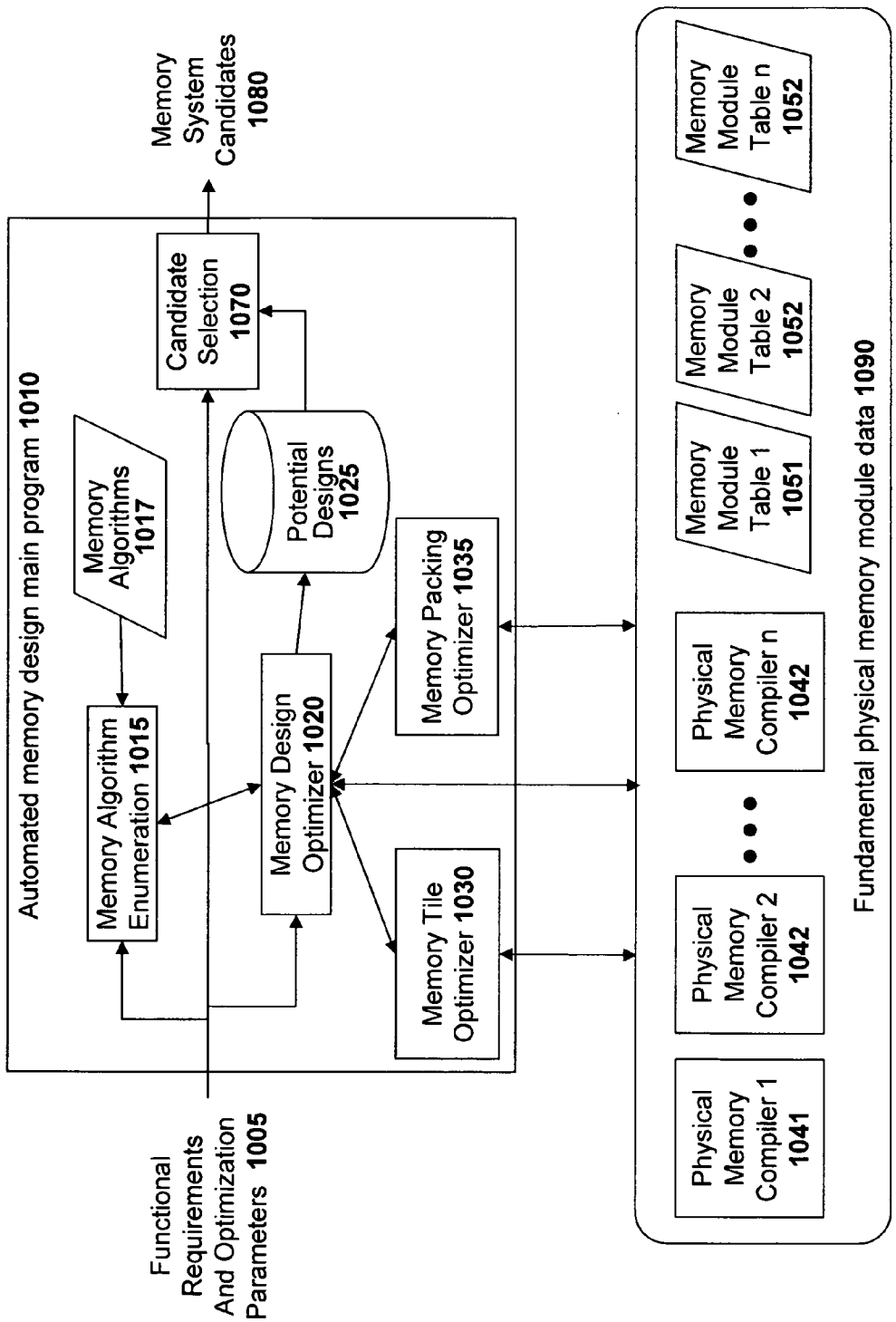
FIG. 10 illustrates a high-level block diagram for one embodiment of an automated system for designing memory systems.

FIG. 10 illustrates a high-level block diagram for one embodiment of an automated system for designing memory systems. The automated memory design system may be implemented as a computer program (or set of computer programs) that accept inputs from an integrated circuit designer or system architect and output memory system designs and related information that allow the integrated circuit designer to construct and test a memory system.

The main automated memory design program 1010 receives a set of functional requirements and optimization parameters 1005 that specify the desired memory system. A memory algorithm enumeration module 1015 selects some memory algorithms that can fulfill the functional requirements from a set of memory algorithms 1017. For each selected memory algorithm, the memory algorithm enumeration module 1015 has the memory design optimizer considers various specific implementations of the memory design and stores designs that fulfill the functional requirements in a potential design storage 1025. The memory design optimizer 1020 adjust the different parameters of the memory system design and uses the memory tile optimizer 1030, the memory packing optimizer 1035, and the fundamental physical module data 1090 as needed.

The fundamental physical memory module data 1090 consists of the various different fundamental memory modules that can be used by the automated memory design program 1010. The information within the fundamental physical memory module data 1090 may be in the form of physical memory compilers (1041, 1042, and 1043) which are may be called to request a memory module or in the form raw memory module tables (1051, 1052, and 1053) that may be searched for memory modules. The different physical memory compilers and memory module tables may represent memory systems available from different vendors and memory modules available in different semiconductor manufacturing processes. When the memory design optimizer 1020 needs a fundamental memory module, the memory design optimizer 1020 may directly access the fundamental physical memory module data 1090. Alternatively, the memory design optimizer 1020 may call the memory tile optimizer 1030 and the memory packing optimizer 1035 which attempt to create better fundamental memory systems as disclosed earlier in this document.

After the memory design optimizer 1020 has created optimized versions of all the memory designs proposed by the memory algorithm enumeration module 1015 then the potential memory system design storage 1025 will contain information on many possible memory designs. A candidate selection module 1070 then examines all the possible memory designs and outputs a set of the best candidate memory systems 1080. The candidate selection module 1070 will select the best candidates using the optimization parameters 1005 that were provided to the automated memory design program 1010.

Figure 11:
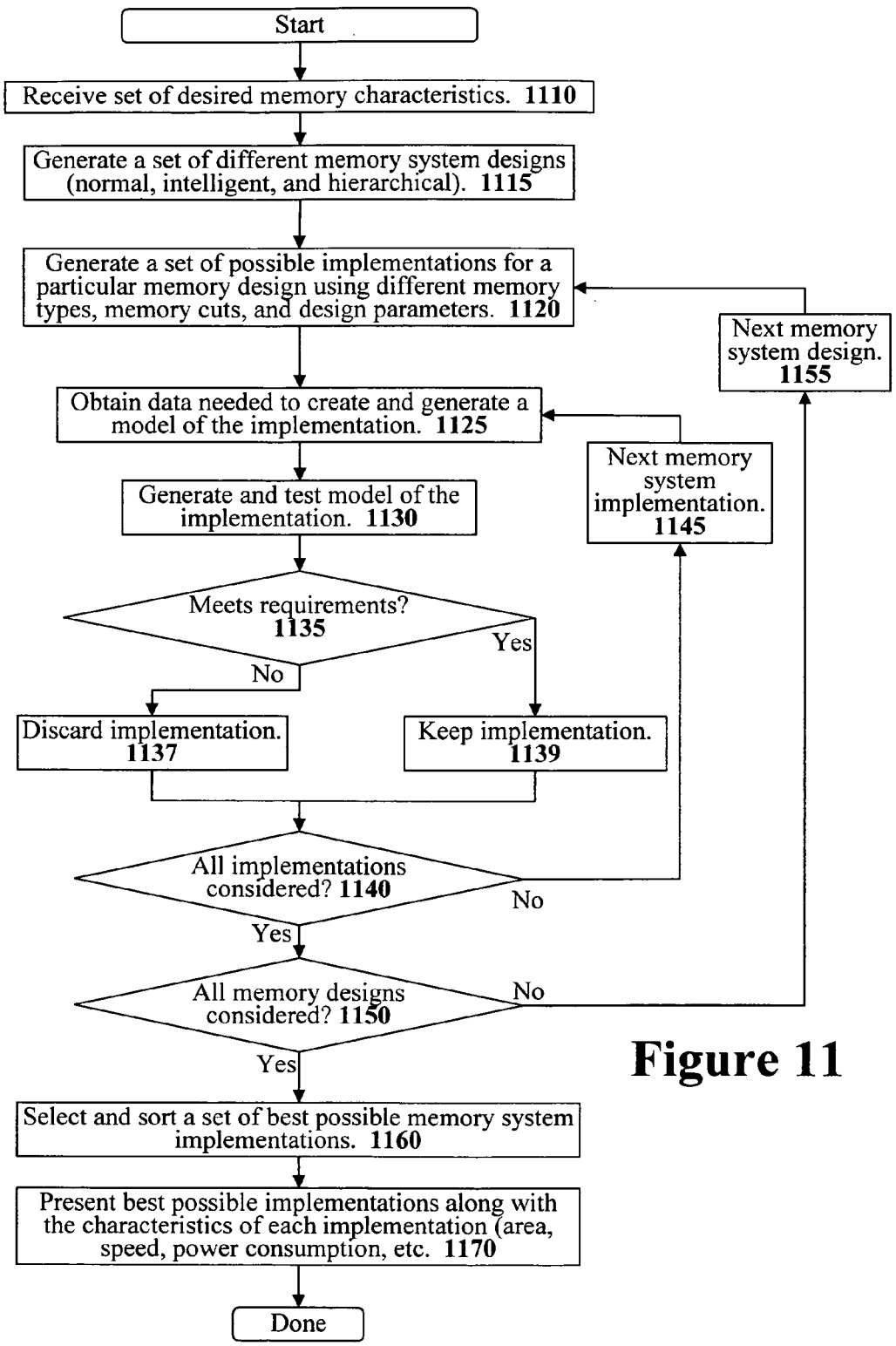
FIG. 11 illustrates a flow diagram for one embodiment of an automated system for designing memory systems.

FIG. 11 illustrates a flow diagram for one embodiment of an automated system for designing memory systems. The automated system for designing memory systems disclosed in FIG. 11 considers many different types of memory system designs including traditional memory systems, intelligent memory systems, and hierarchical intelligent memory systems. The automated system analyzes each potential memory system and outputs a set of proposed memory systems. The automated memory design system may be implemented as a computer program (or set of computer programs) that accept inputs from an integrated circuit designer or system architect and output memory system designs and related information that allow the integrated circuit designer to construct and test a memory system.

Initially, at stage 1110, the automated memory design system receives a set of desired memory system characteristics from a designer that requires a memory system. The exact set of memory characteristics entered in stage 1110 will vary depending on the particular implementation. In some embodiments, the user of the automated system will enter an exhaustive set of characteristics that define a needed memory system in great detail. In such an embodiment, the automated system will output only a few potential memory system designs (or even just one). In other embodiments, the user of the automated system will enter a relatively small number of characteristics such that the automated system may generate a large number of potential memory system designs that can be chosen from. In some cases wherein a user has entered very challenging requirements, the automated memory design system may not be able to design a memory system that fulfills all of the requirements.

In one embodiment, the automated memory design system allows the integrated circuit designer to enter a data width, an address width, a read performance, and a write performance. From these input parameters, the system will generate a set of potential memory system designs. The data width specifies the size of the data word that will be accessed. In some embodiments, the system will allow sub-word access. The address width specifies the capacity of the memory system since the width of the address specifies how many different memory addresses can be represented. In some embodiments latency, power bounds, area bounds, and other limitations are also specified. These limitations may be used to eliminate potential memory system designs that cannot be used for the specific integrated circuit application.

The read performance and write performance characteristics specify how many memory access requests must be handled and how fast the memory access requests must be handled. For example, read performance may specify that two read requests must be handled simultaneously and maximum clock frequency. Note that memory system does not have to be symmetric. For example, a memory system may need to be able to handle two read operations or one write operation.

Various logical combinations of memory access requirements may be specified by the designer. For example, a designer may request a system that can handle two read operations AND two read operations or the designer may request a memory system that can handle two read operations OR two read operations. In one embodiment, the automated memory system allows the designer to specify a set of memory access requirements with a bracketed set of OR conditions where the conditions within each bracket are combined with a logical AND. For example, to generate a memory system that can handle two read operations or one write operation then the designer would specify "(2R) OR (1W)". Similarly, to generate a memory system that handles three reads and one write simultaneously or two writes and one read simultaneously then the designer may specify "(3R1W) OR (2W1R)". Very complex memory systems may be specified in this manner such as a memory to perform the following in a single cycle: "(3R1W) OR (2R2W) OR (1R3W) OR (4W)".

After accepting a set of memory system characteristics at stage 1110, the automated system then enumerates a set of memory system designs that may be able to handle the memory system characteristics at stage 1115. This is operation of the memory algorithm enumeration module 1015 in FIG. 10. Many different types of memory systems will be considered. Traditional memory systems (that do not implement intelligent methods) will be considered when traditional memory systems are capable of fulfilling the specified memory characteristics.

Intelligent memory systems are considered when the specified memory characteristics require multiple memory requests to be handled simultaneously. Hierarchical memory systems will also be considered when the specified memory characteristics can be implemented with a hierarchical memory system. Due to their complexity and latency, hierarchical memory systems will often not be used when the specified memory characteristics are not complex. However, hierarchical memory systems are often required to implement complex features such as handling many memory access operations simultaneously.

After generating a set of potential memory system designs at stage 1115, the automated system begins analyze all of the potential memory system designs. Starting with a first potential memory system design, the automated system generates all of the potential implementations of that memory system design at stage 1120. This is the function of the memory design optimizer 1020 in FIG. 10.

For example, if the memory system design is a traditional memory system then the automated memory system will consider various different types of memory cells that may be used such as SRAM, embedded DRAM, and any other memory that can be fabricated in the specific semiconductor manufacturing process being used. And for each different memory cell type, the memory system can be constructed from many different 'cuts' that combine memory cells in various different shapes and sizes of memory arrays. Note that the memory tile optimizer 1030 and memory packing system optimizer 1035 described with reference to FIG. 10 and earlier in this document may be accessed in this stage to optimize a memory design.

Intelligent memory systems provide even more potential memory system implementations. Each different type of intelligent memory system includes a set of design choices for that type of intelligent memory system. For example, the intelligent memory system disclosed in FIG. 5A is implemented with five different memory banks and one hundred entries in each memory bank. But the same intelligent memory system can be constructed with a different number of memory banks and a different number of rows within each memory bank. Changing various parameters such as the number of banks will affect the performance and specifications of the memory system.

The intelligent memory systems may also be affected by all of the variations possible to a traditional memory designs since an intelligent memory system contains traditional memory systems. For example, all of the memory banks (banks A, B, C, D, and E) in the intelligent memory system 500 may be constructed from any of the available memory cell types. Similarly, the memory banks can be created from various different memory 'cuts' of different shapes and sizes. To create the different possible implementations, the automated memory system designer may call the memory tile optimization system and the memory packing system. The memory tile optimization system and the memory packing system may in turn call a physical memory compiler to generate possible physical memory systems that may be used and obtain their features.

All of the different possible methods of implementing the hierarchical intelligent memory designs must also be considered in the same manner. Within a hierarchical intelligent memory design, each different intelligent memory system has several parameters that may be adjusted. Furthermore, the fundamental memory systems used within a complex hierarchical memory design can each be implemented with different memory cell types and different memory cuts. The bottom-up and top-down approaches disclosed in an earlier section of this document may be used to create hierarchical intelligent memory designs.

After generating a set of potential memory system designs at stage 1115 and a set of implementations for a particular memory system design at stage 1120, the automated system begins to analyze each possible memory system implementation. At stage 1125, the automated system obtains the needed data to generate a model for one particular implementation. The data may be obtained from design templates of an intelligent memory system, physical memory compilers, memory data tables, and any other source of needed information. This information is used to create and test the memory system model at stage 1130. The model will provide information about memory system implementation such as physical metrics (physical dimensions, shape, interconnects, fabrication process requirements, etc.), operating metrics (power consumption, temperature limits, etc.) and performance metrics (maximum clock speed, access speed, etc.).

The information from the generated memory system model is then compared with the memory system requirements at stage 1135. This analysis may be performed by memory design optimizer 1020. Some memory system designs that seemed to be promising may not actually provide the needed memory performance or fall within a latency limit. For example a hierarchical intelligent memory system constructed using two layers of intelligent memory systems, both of which are below the read latency bound for a specific memory request, may in combination exceed the overall latency limitation required for the memory system. With other memory system designs, some implementations will meet the required specifications but other implementations of the same design will not. The automated system will discard the memory system implementations that fail to meet the required characteristics at stage 1137. The automated system will keep the memory systems implementations that fulfill fulfil the required characteristics at stage 1139. This is depicted as storing the memory system implementation in potential designs storage 1025 in FIG. 10. For each kept implementation, the automated system will store overall memory system design along with the detailed implementation information such as intelligent memory system parameters, memory cell type, memory system cut, etc.

Next, at stage 1140, the system determines if that was the last possible implementation of a specific memory system design. If it was not the last implementation, then the system moves to the next possible implementation of that memory system design at stage 1145 and returns to stage 1125 to test that next implementation of that particular memory system design.

If that was the last implementation possibility, then the automated system determines if every possible memory design type has been tested at stage 1150. If it was not the last memory system design, then the automated memory design system moves to the next possible memory system design at stage 1155 and returns to stage 1120 to begin testing all of the different implementations of that potential memory system design.

After considering all of the different memory system designs and the different implementations of each memory system design, the automated memory design system will have a collection of potential memory system implementations that meet the requirements provided by the integrated circuit designer. However, many of these memory system designs may not be good candidate solutions. For example, some memory system implementations may fulfill the requirements but have characteristics that are worse in every respect than other implementations in the set of potential memory system implementations. Such memory system implementations that are objectively worse in every metric than another implementation in the set may be dropped from the list of potential memory system implementations.

The remaining memory system implementations may then be sorted in using some specific metrics provided by the integrated circuit designer at stage 1160. This may be performed by candidate selection module 1070 of FIG. 10. For example, an integrated designer that is very short on integrated circuit layout area may sort the potential implementations by layout area. Similarly, a designer that is creating a portable computer system that must operate on limited battery power may sort the potential memory system implementations by their power consumption. Other performance and physical metrics that may be deemed important include latency, access time, reliability, and manufacturing yield.

Finally, at stage 1170, the best memory system implementations are presented to the designer in a list sorted by a metric chosen by the designer. Each memory system implementation may be presented along with a list of the characteristics that define that particular implementation. A designer may be optimizing on more than one metric such that the designer may select a memory system design that is not optimal in any one metric but provides a good balance of the various metrics important to the integrated circuit designer.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim.

Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A method of designing a digital memory system, said method comprising:
   receiving a set of desired memory system performance characteristics from a circuit designer;
   generating a plurality of possible memory designs that meet said desired memory system performance characteristics, at least one of said plurality of possible memory designs comprising
      at least one intelligent memory controller, said intelligent memory controller implementing a memory algorithm to select a storage location, and
      at least one fundamental memory circuit, said fundamental memory circuit for storing data;
   selecting a subset of said plurality of possible memory designs, said subset of said plurality of possible memory designs optimized for a set of optimization parameters; and
   outputting said subset of said plurality of possible memory designs.

2. The method of designing a digital memory system as set forth in claim 1, said method further comprising:
   receiving said set of optimization parameters from said circuit designer.

3. The method of designing a digital memory system as set forth in claim 1 wherein generating a plurality of possible memory designs comprises:
   enumerating a set of memory design types that may fulfill said set of desired memory system performance characteristics; and
   optimizing implementations of said set of memory design types to create said plurality of possible memory designs.

4. The method of designing a digital memory system as set forth in claim 3 wherein said memory design types include traditional memory systems.

5. The method of designing a digital memory system as set forth in claim 3 wherein said memory design types include intelligent memory systems.

6. The method of designing a digital memory system as set forth in claim 3 wherein said memory design types include hierarchical intelligent memory systems.

7. The method of designing a digital memory system as set forth in claim 3 wherein optimizing implementations of said set of memory design types comprises: calling a memory tile optimizer that generates optimized memory modules by combining selected fundamental physical memory modules.

8. The method of designing a digital memory system as set forth in claim 7 wherein said fundamental physical memory modules are obtained from a physical memory compiler.

9. The method of designing a digital memory system as set forth in claim 3 wherein optimizing implementations of said set of memory design types comprises: calling a memory packing optimizer that generates optimized memory modules by packing more than one data item into a data word of a traditional memory module.

10. The method of designing a digital memory system as set forth in claim 9 wherein said traditional memory module is obtained from a physical memory compiler.

* * * * *